H. G. WEBSTER.
TELEPHONE EXCHANGE SYSTEM.
APPLICATION FILED JULY 18, 1913.

1,247,353.

Patented Nov. 20, 1917.
20 SHEETS—SHEET 1.

Witnesses
R.C. Carter
E.M. Jones

Inventor
Harry G. Webster
by
Joseph L. Wright
Attorneys

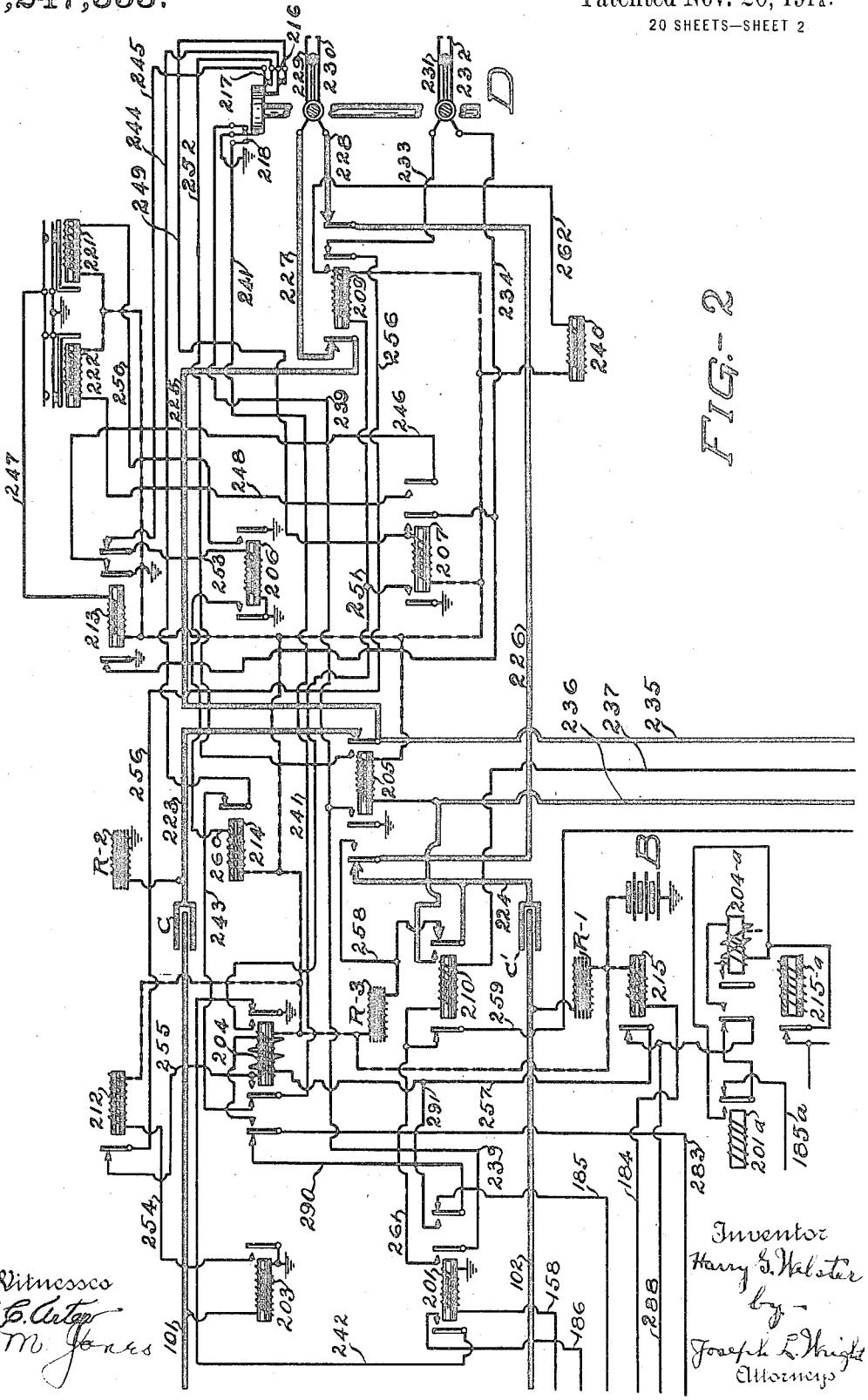

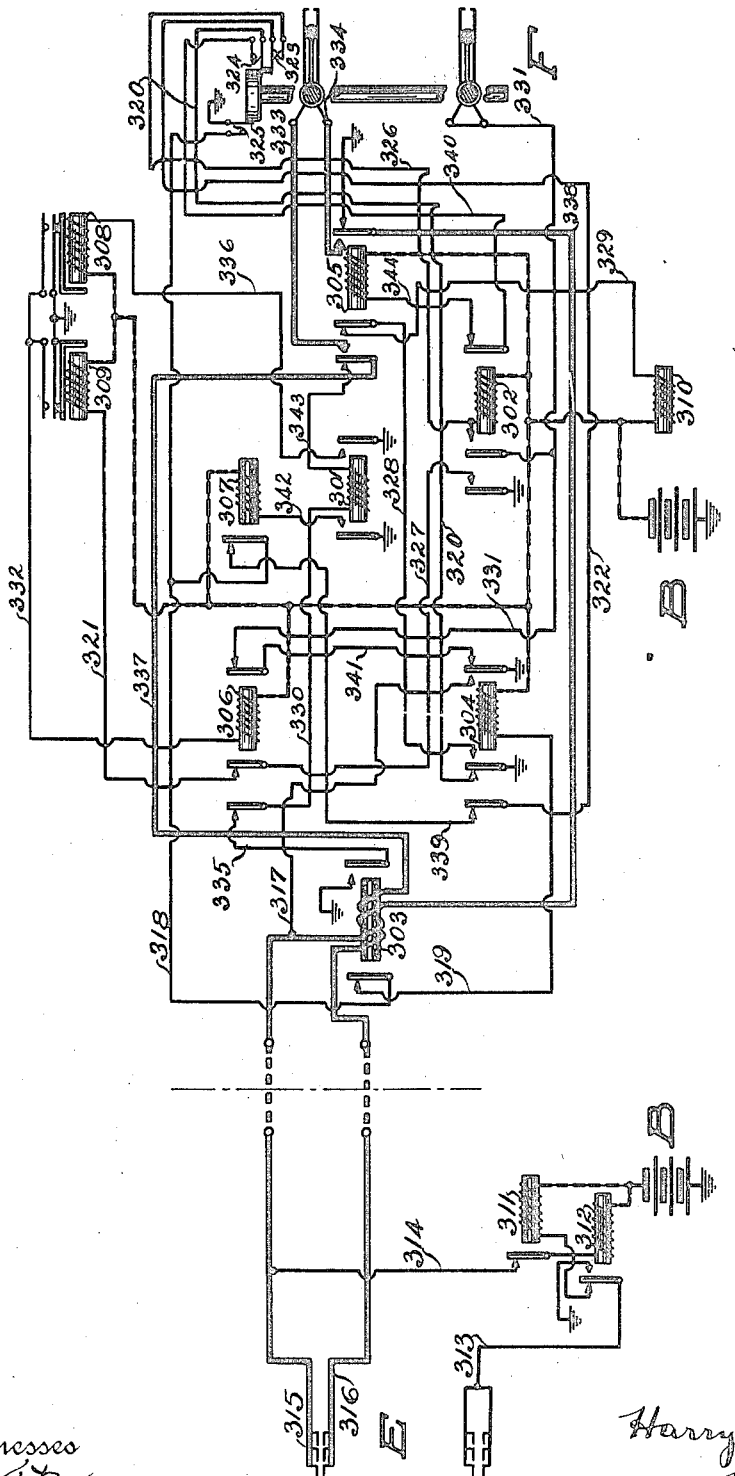

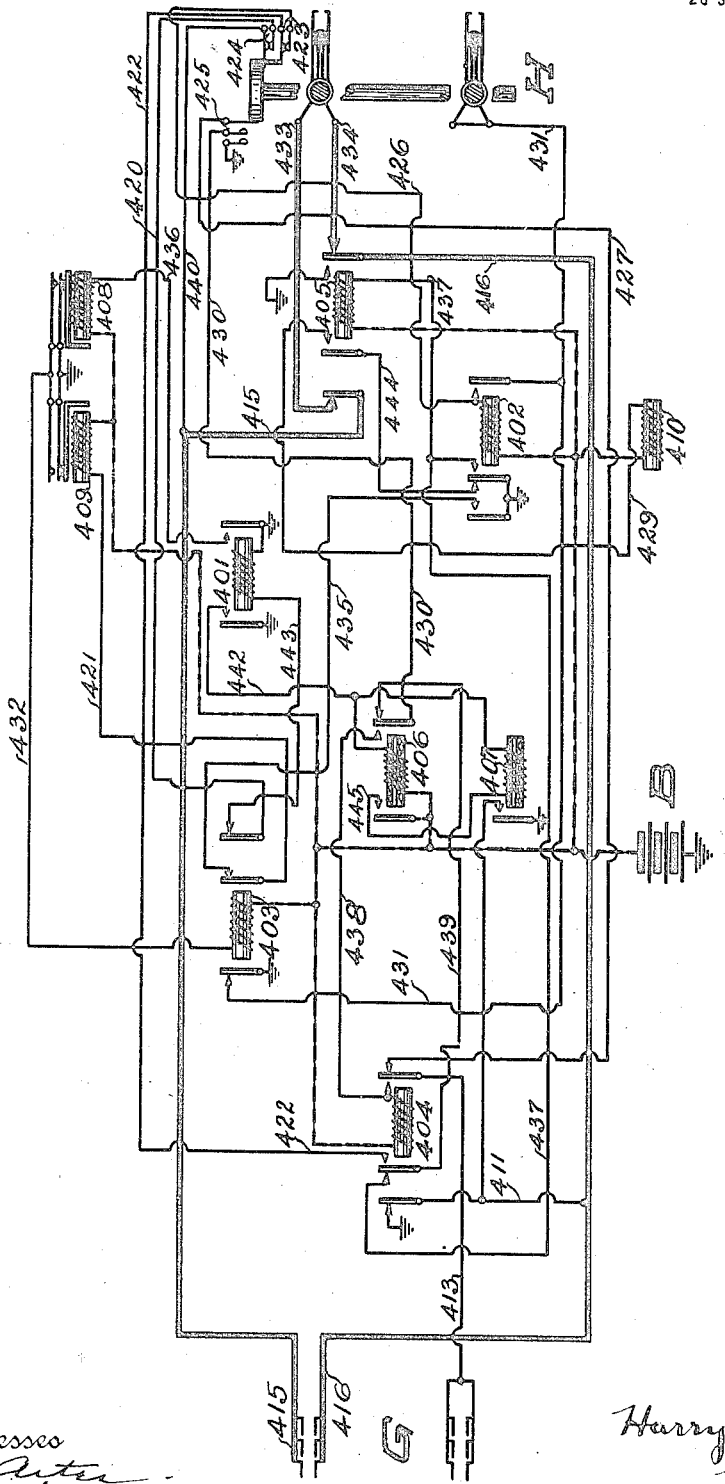

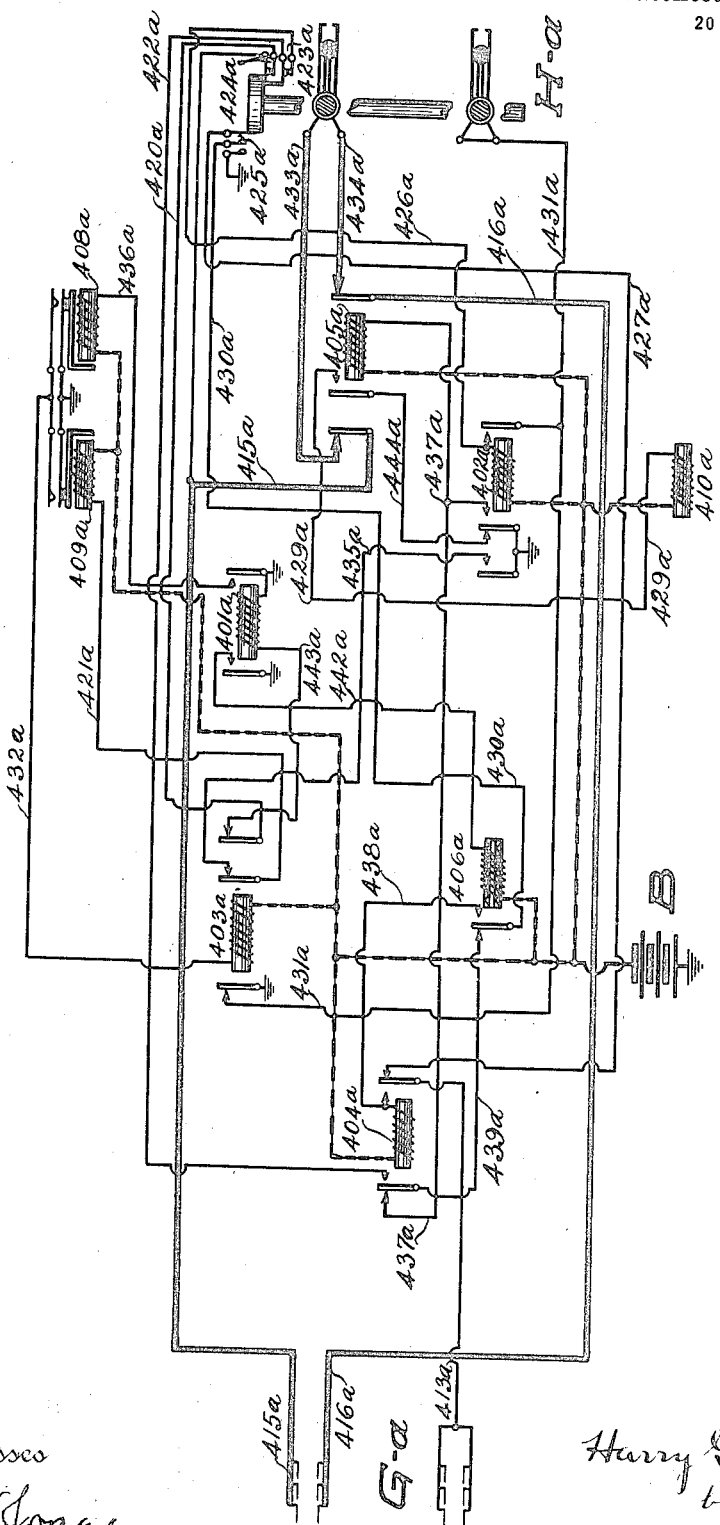

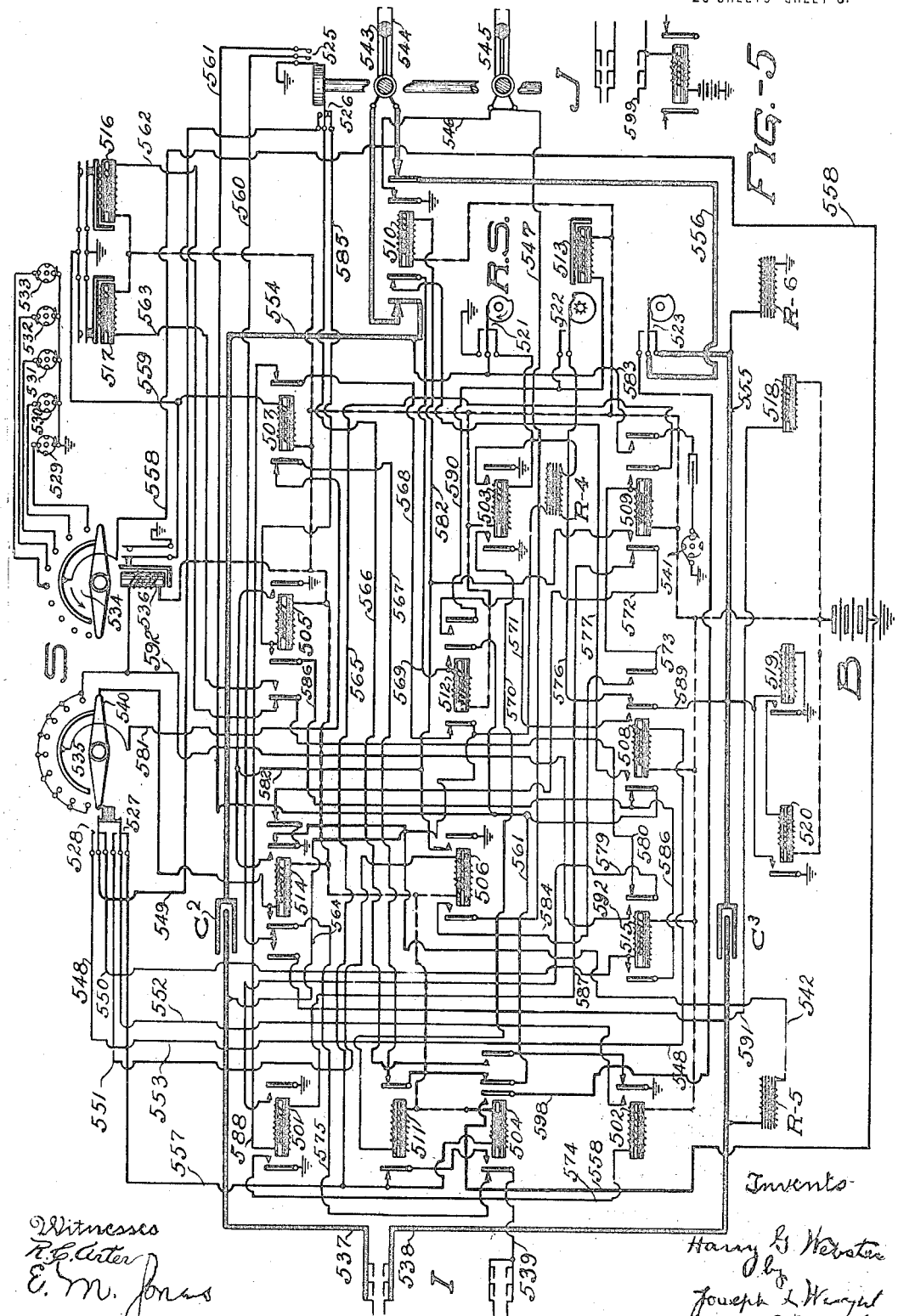

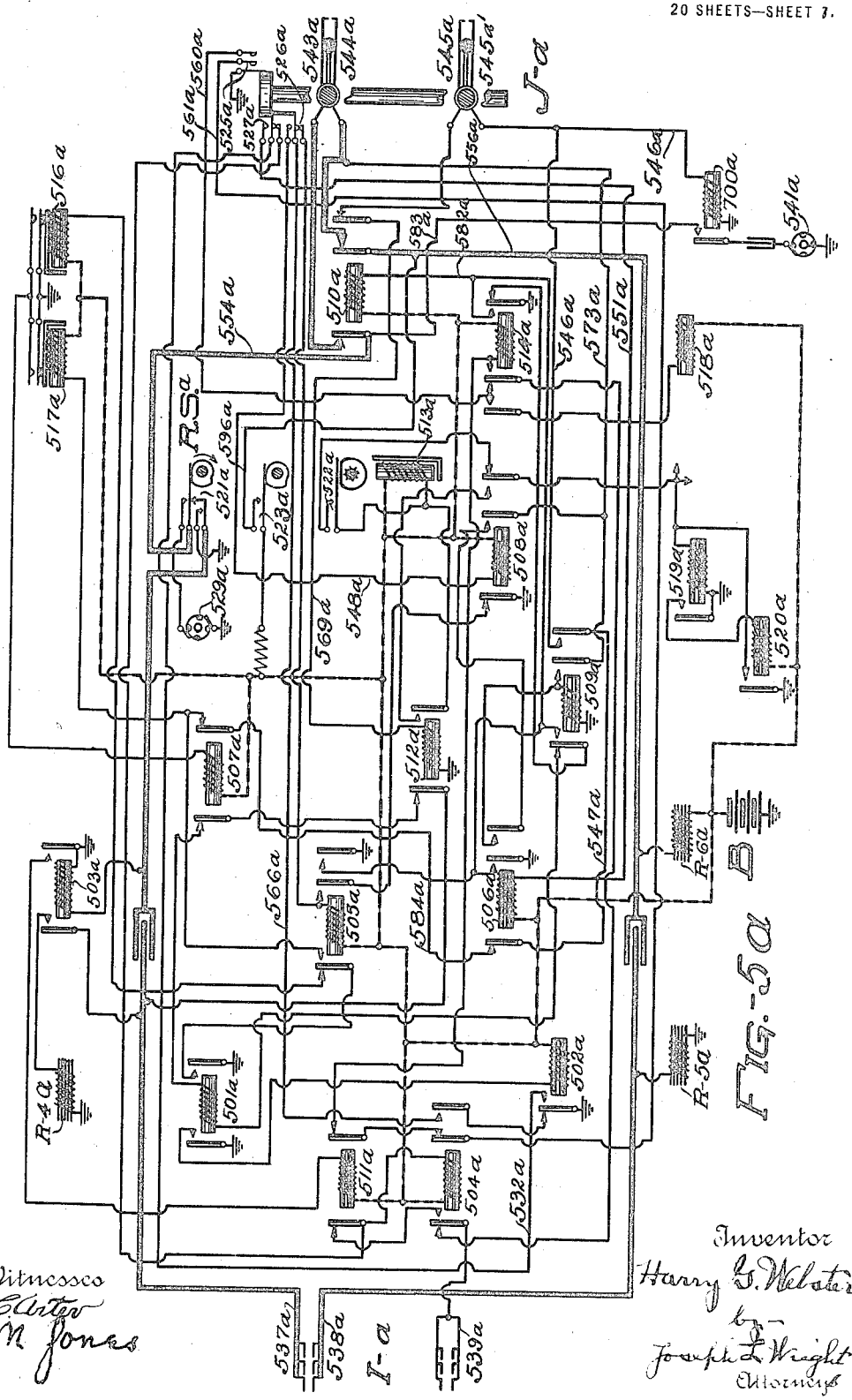

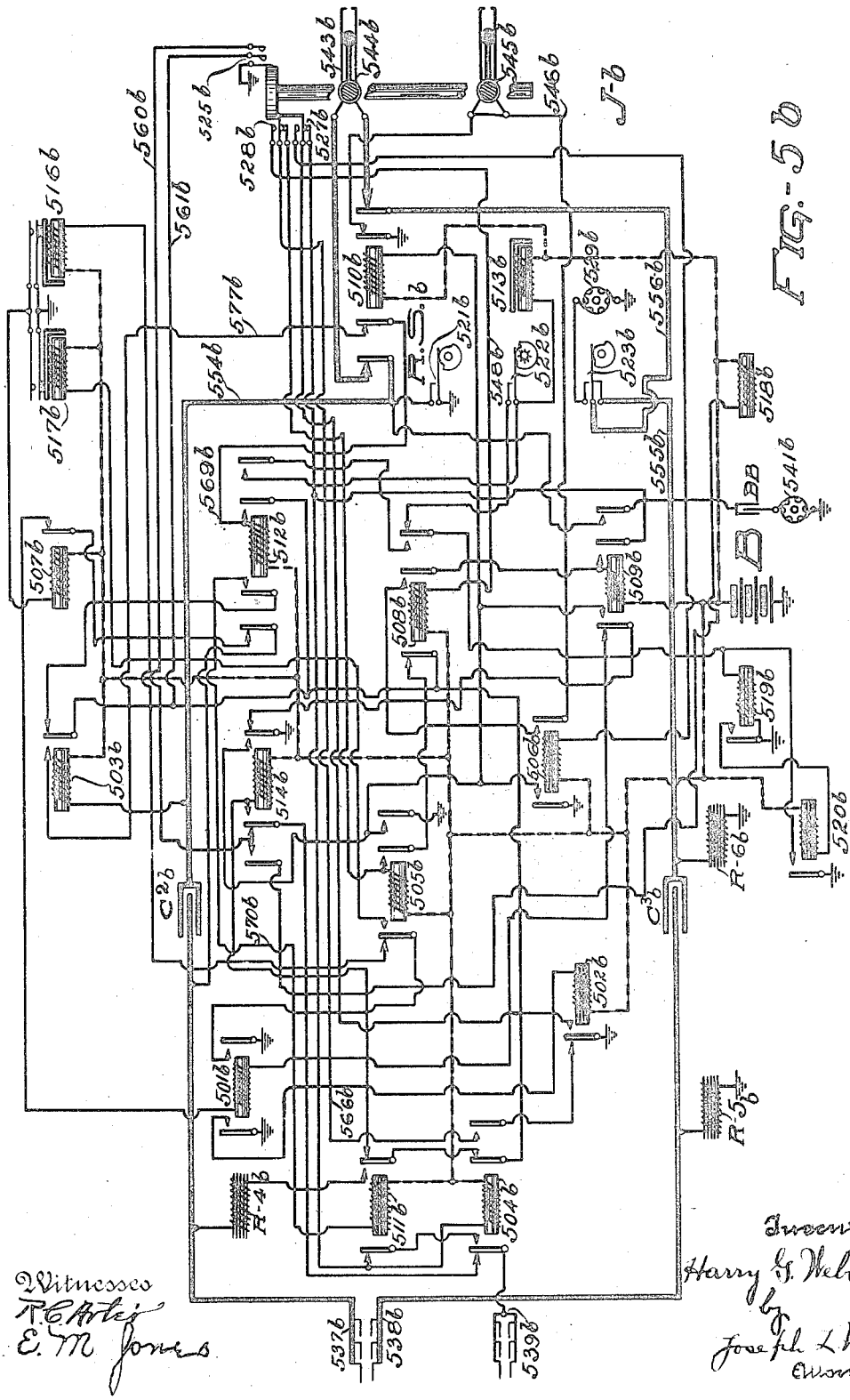

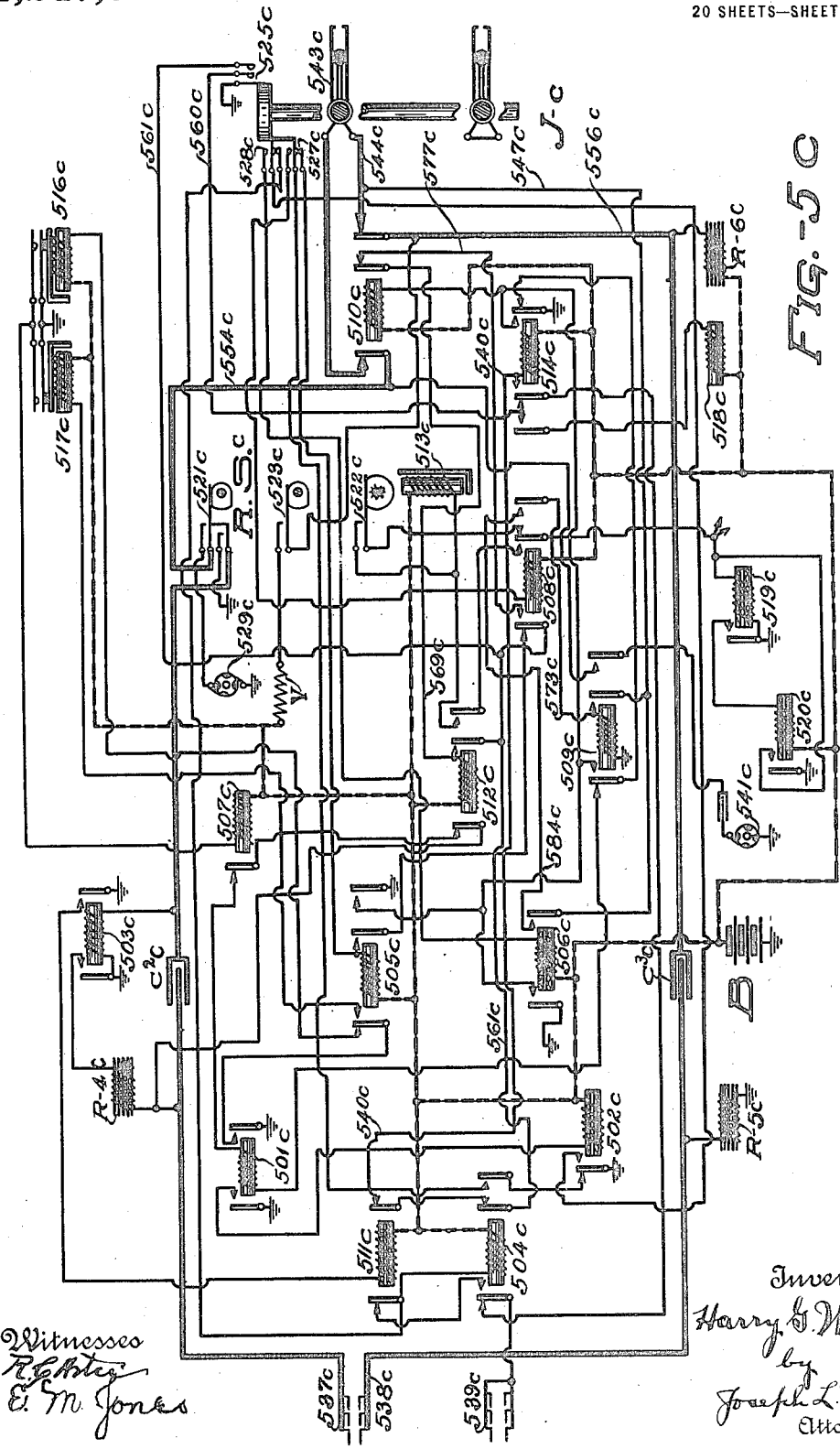

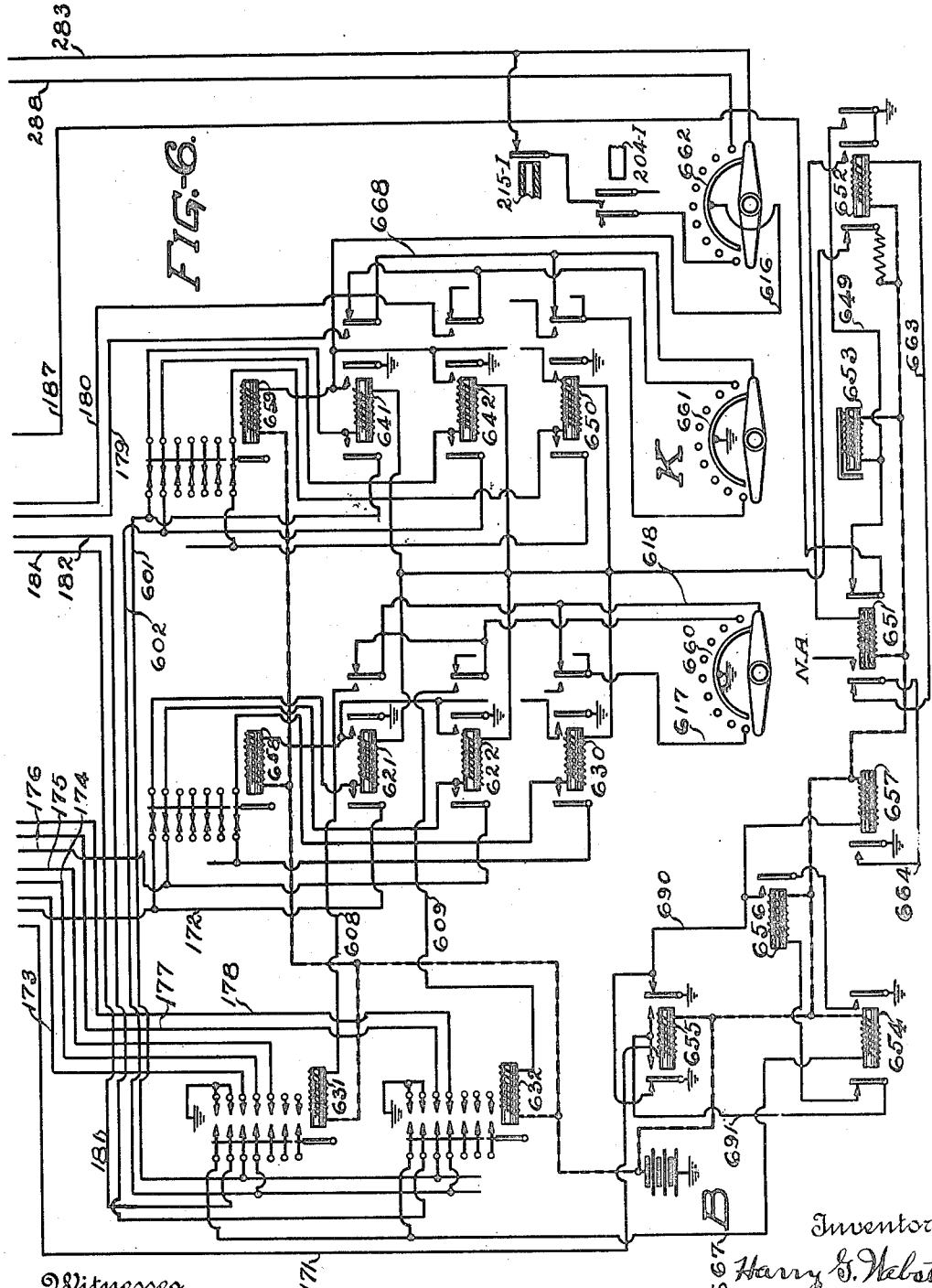

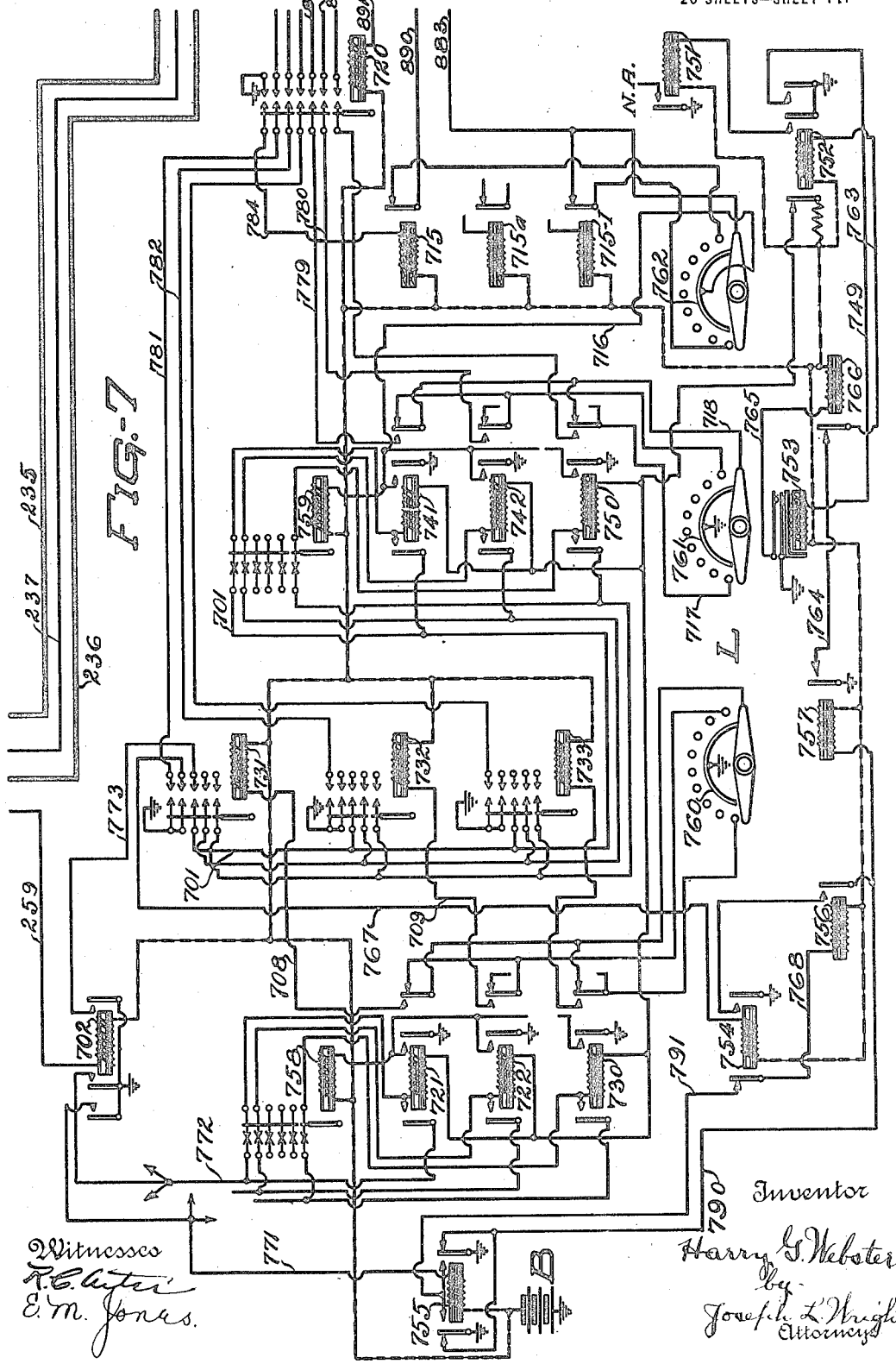

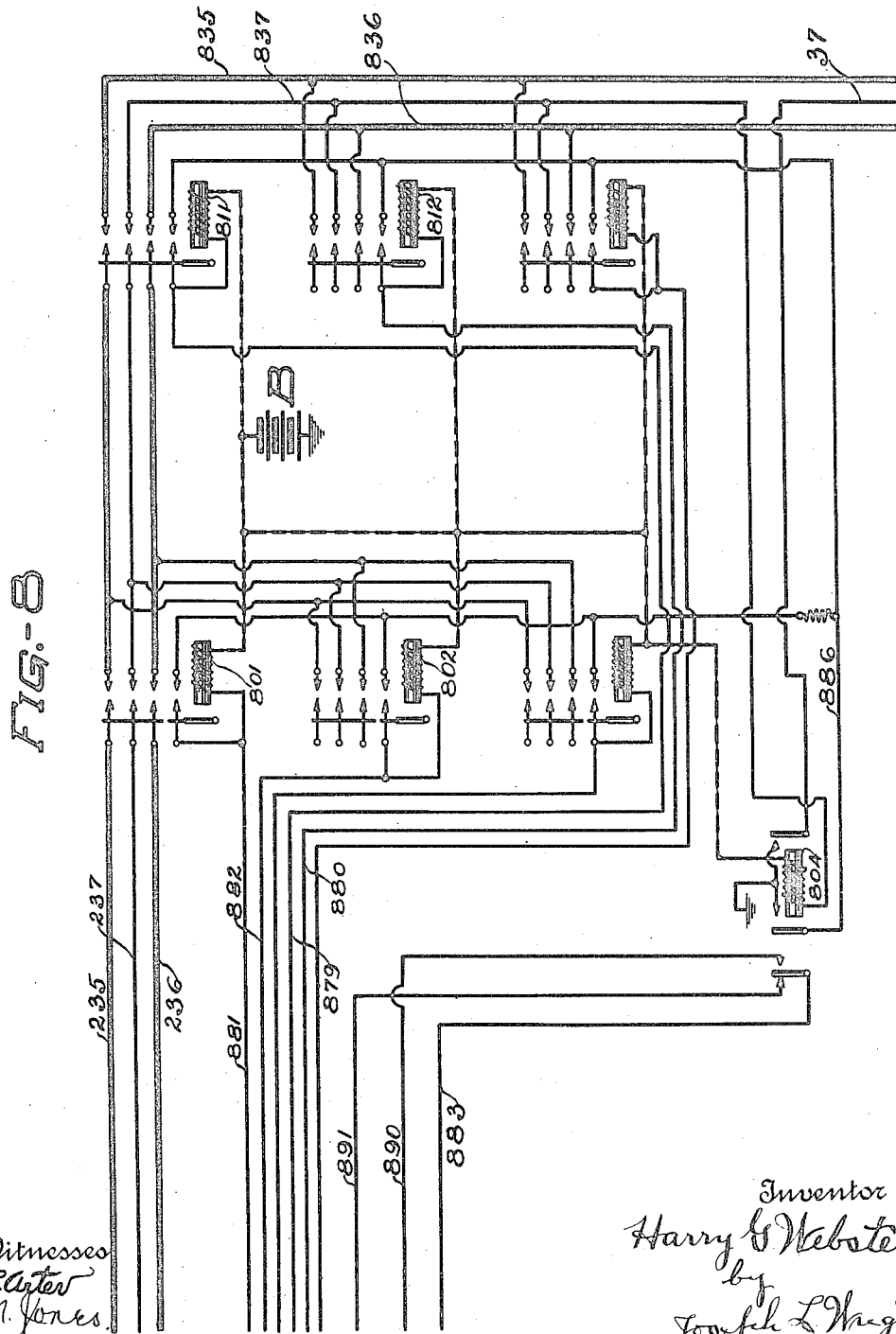

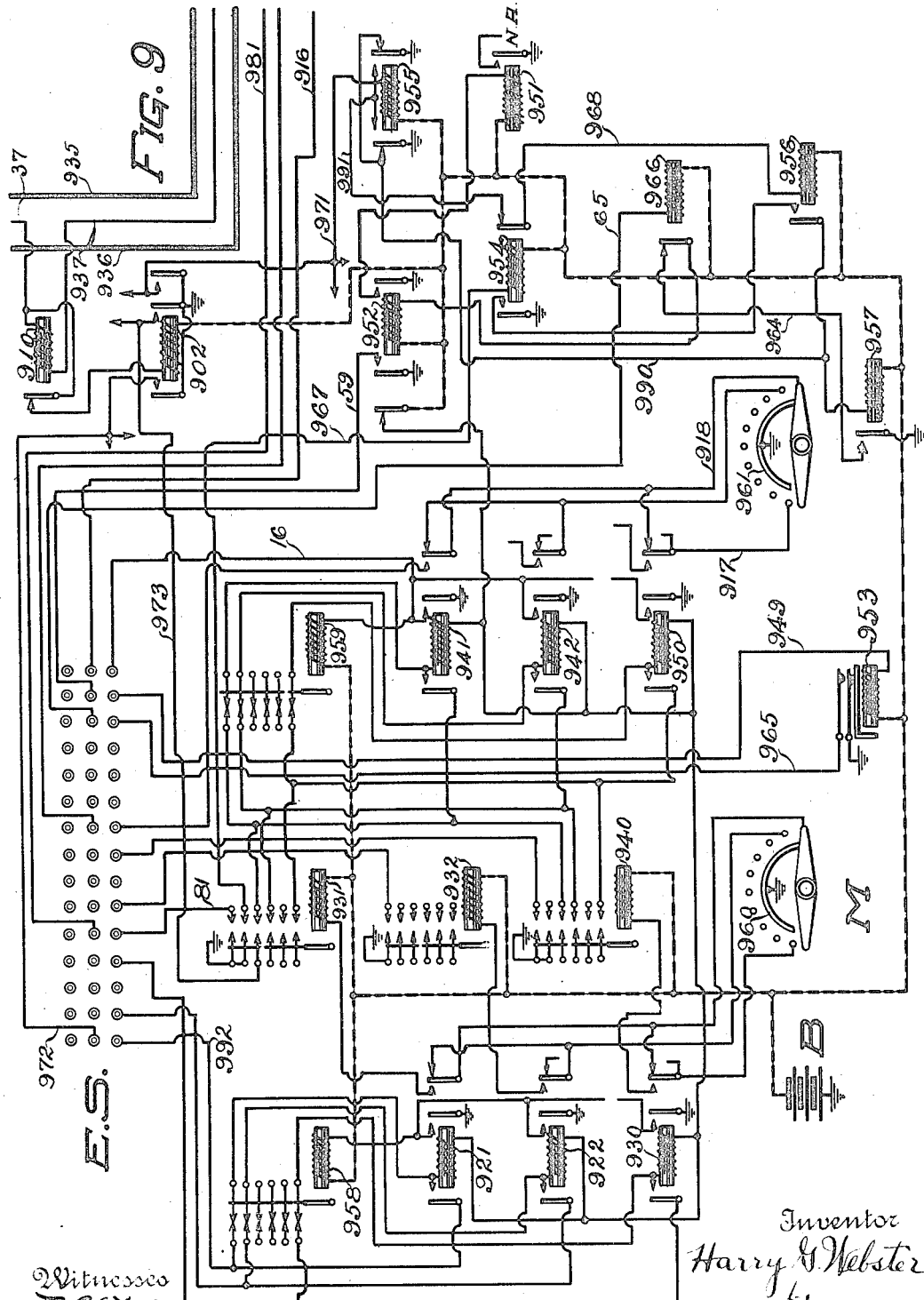

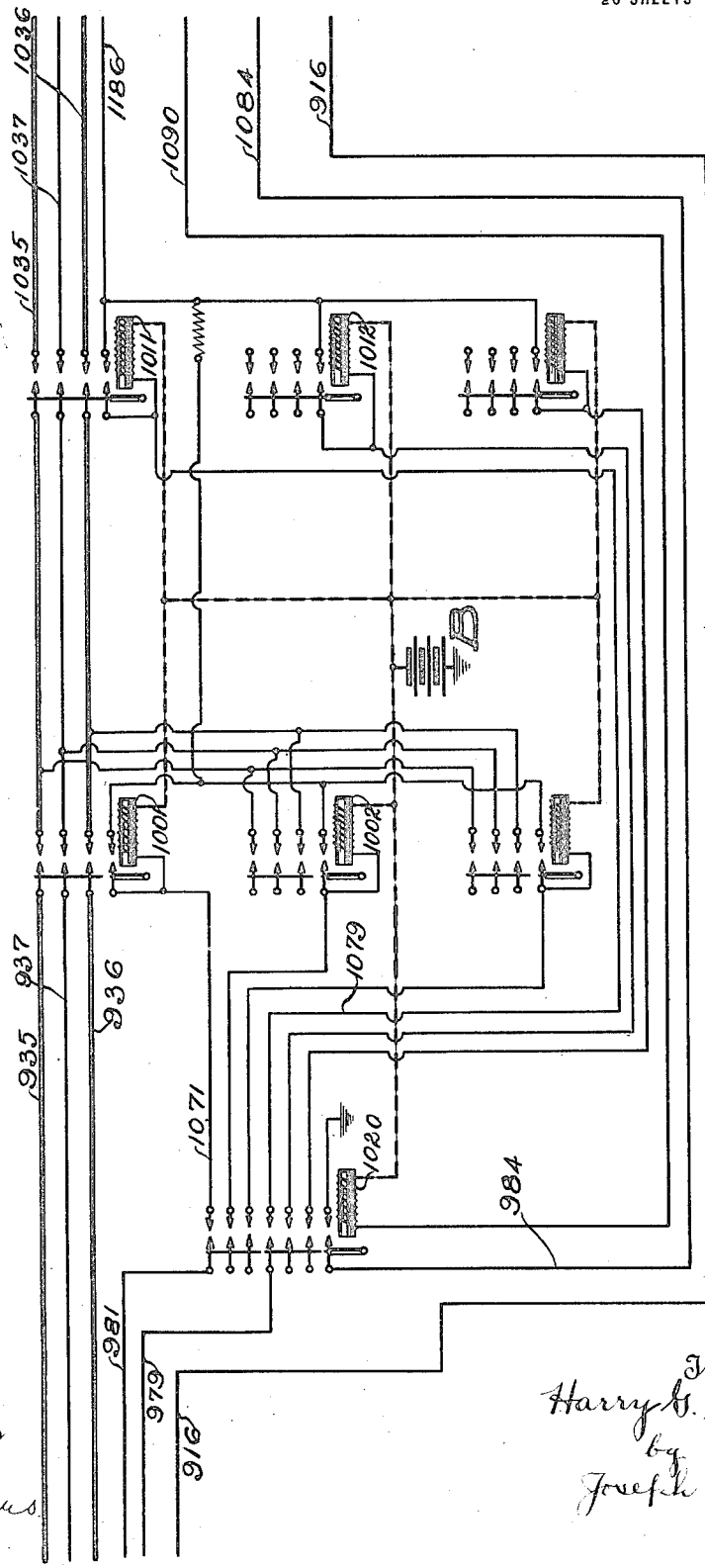

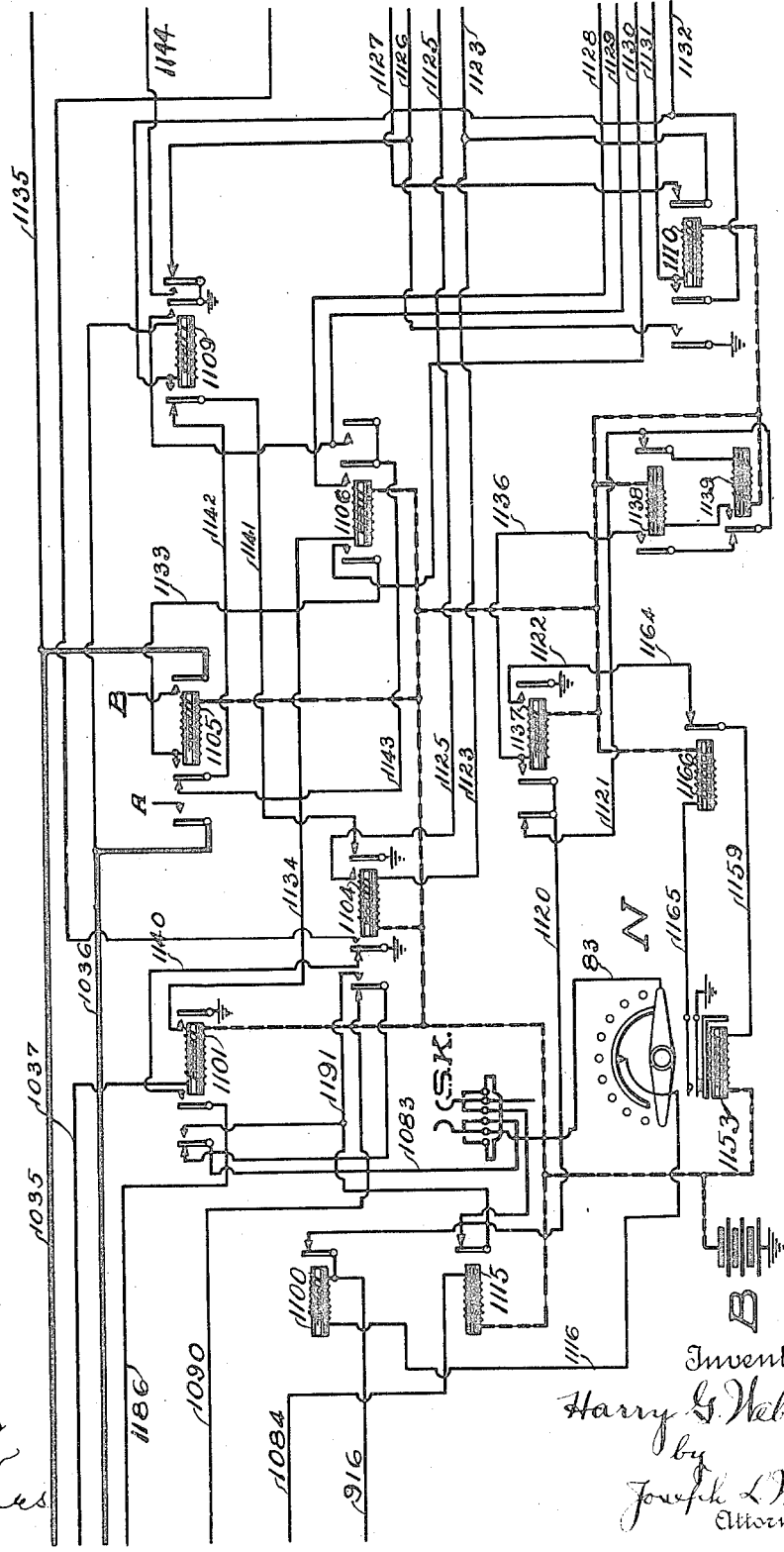

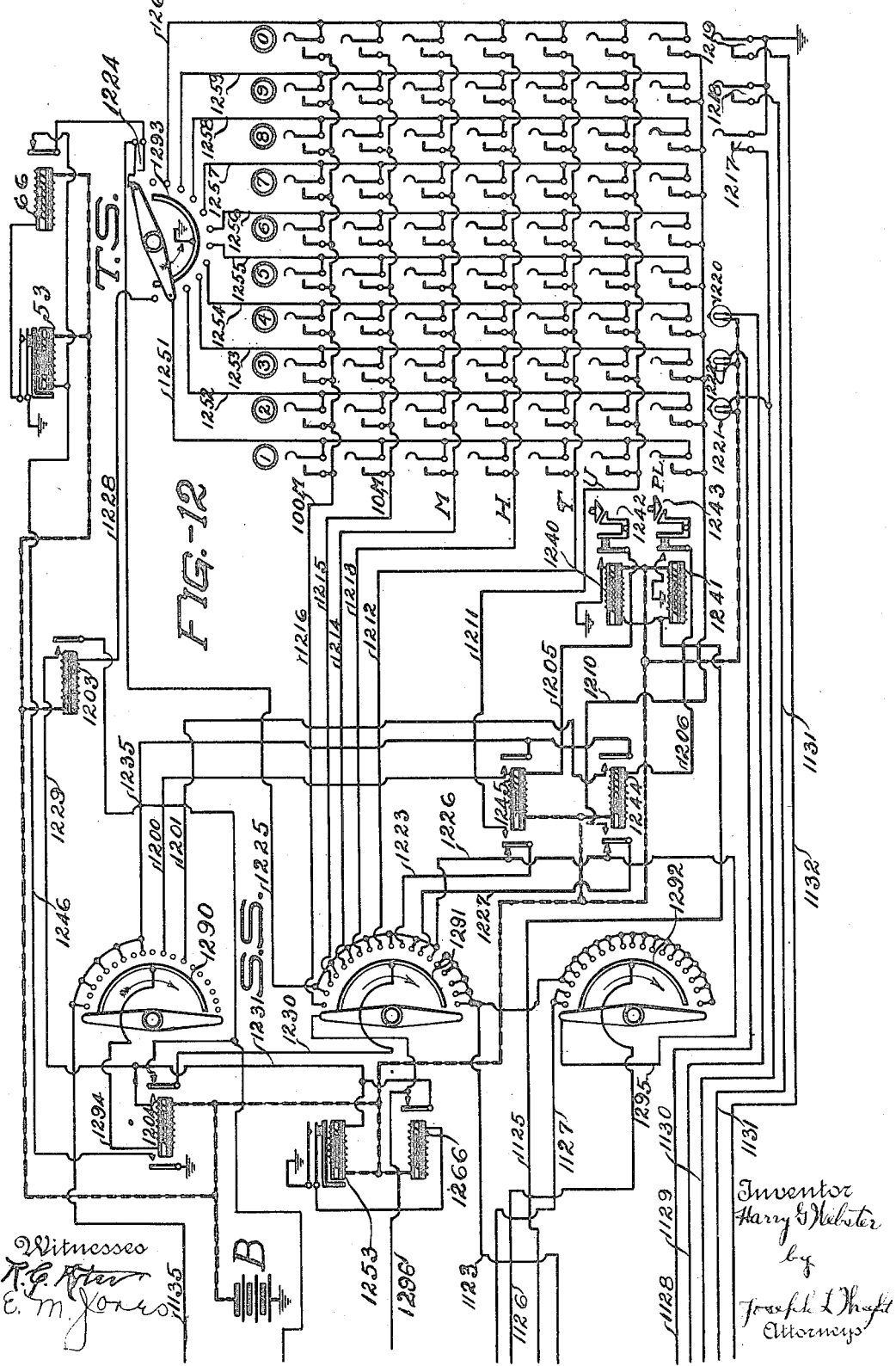

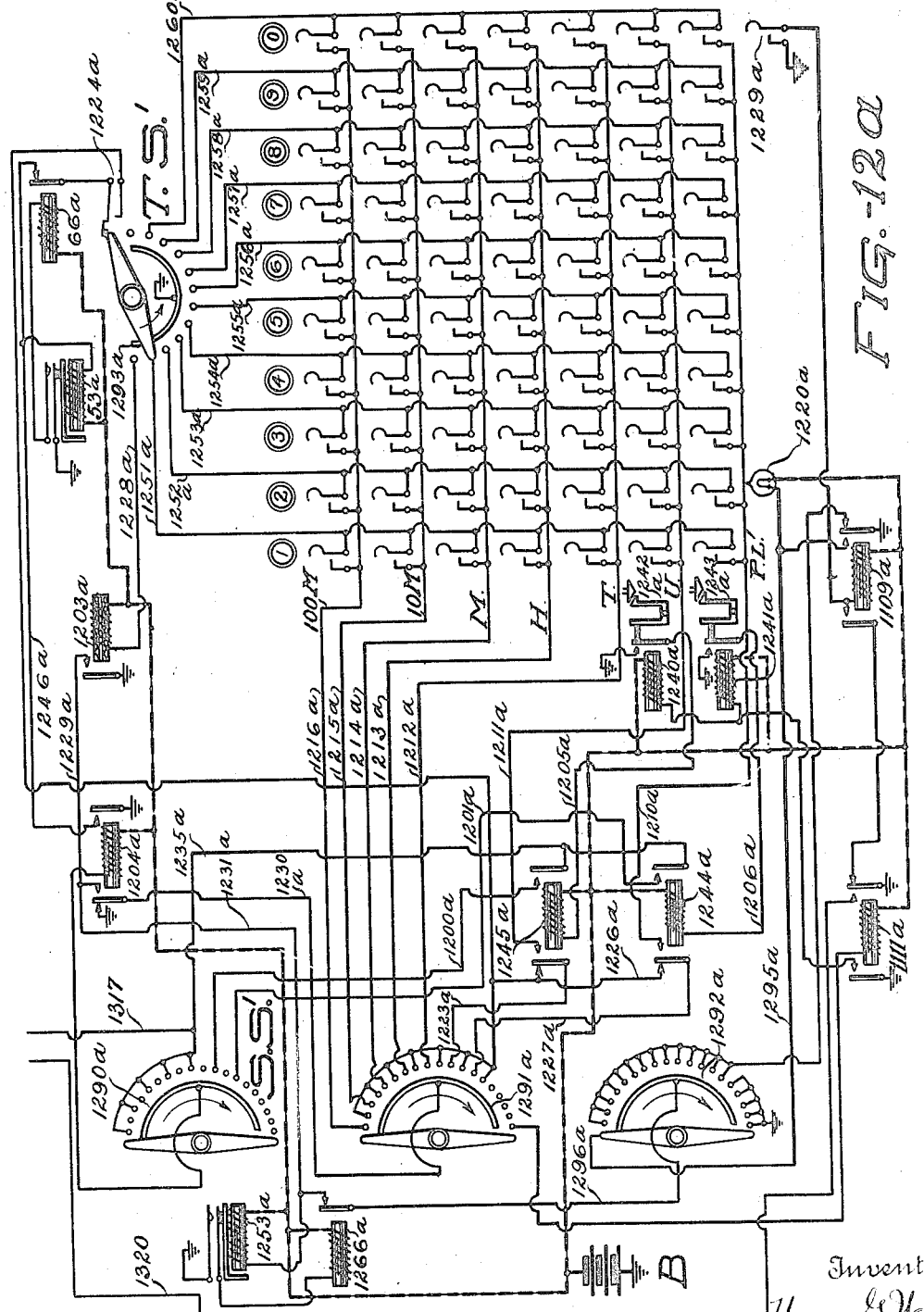

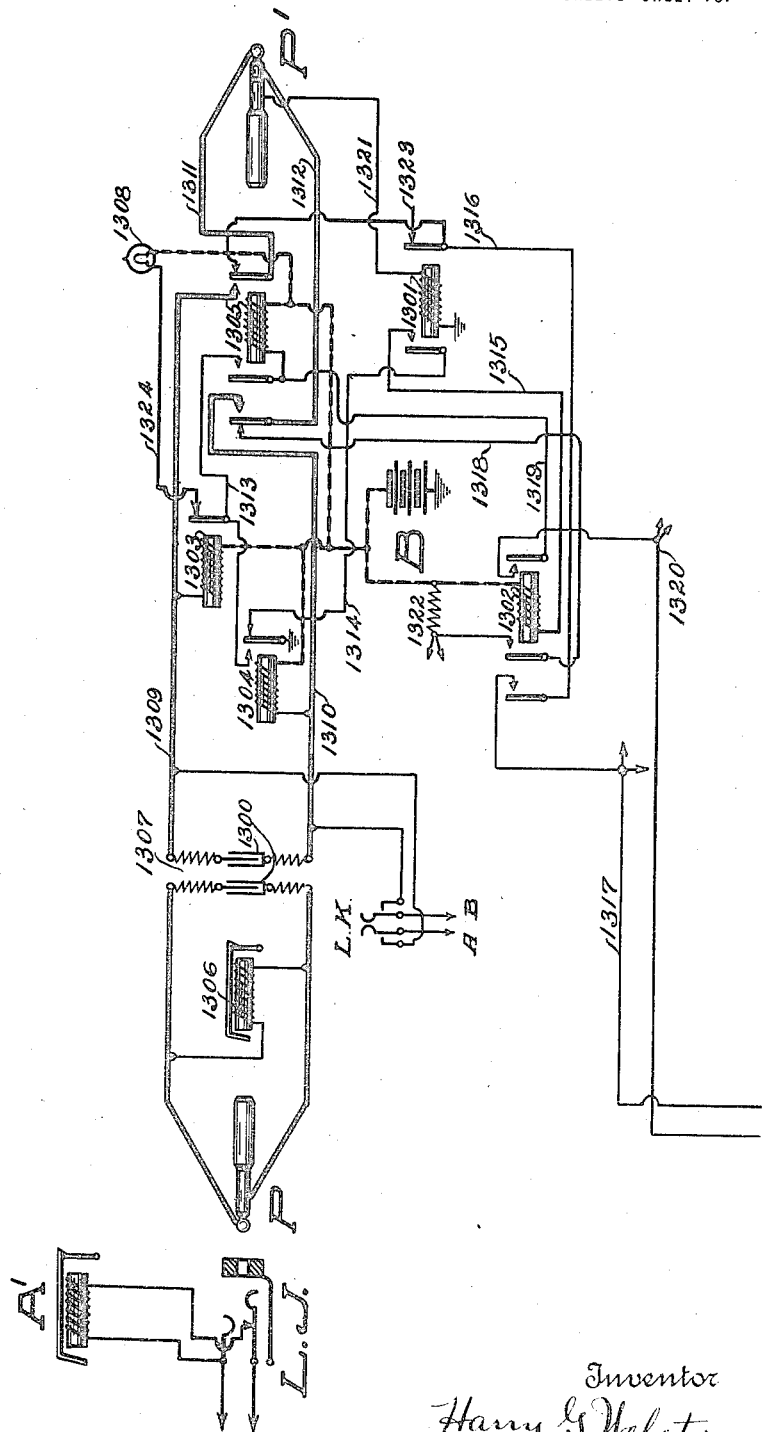

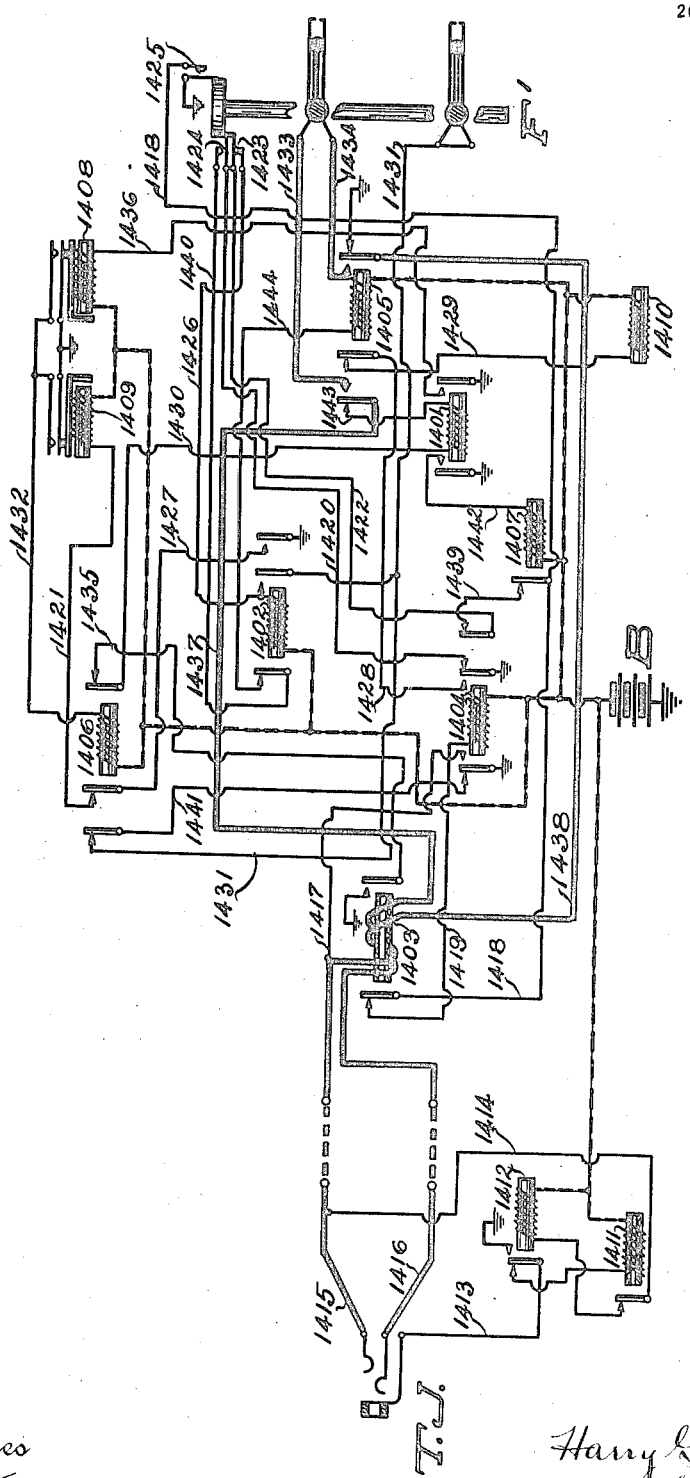

H. G. WEBSTER.
TELEPHONE EXCHANGE SYSTEM.
APPLICATION FILED JULY 18, 1913.

1,247,353.

Patented Nov. 20, 1917.
20 SHEETS—SHEET 20.

WITNESSES:
E. Klaus
E. M. Jones

INVENTOR.
Harry G. Webster
BY Joseph L. Wright
ATTORNEYS.

UNITED STATES PATENT OFFICE.

HARRY G. WEBSTER, OF CHICAGO, ILLINOIS, ASSIGNOR, BY MESNE ASSIGNMENTS, TO JAMES R. GARFIELD, TRUSTEE, OF CLEVELAND, OHIO.

TELEPHONE-EXCHANGE SYSTEM.

1,247,353.     Specification of Letters Patent.     Patented Nov. 20, 1917.

Application filed July 18, 1913. Serial No. 779,753.

*To all whom it may concern:*

Be it known that I, HARRY G. WEBSTER, a citizen of the United States, residing at Chicago, in the county of Cook and State of Illinois, have invented a certain new and useful Improvement in Telephone-Exchange Systems, of which the following is a full, clear, concise, and exact description, reference being had to the accompanying drawings, forming a part of this application.

My invention relates to "telephone exchange systems" and particularly to systems of the semi-automatic type. In systems of this character, automatic switching mechanism is used for establishing connections between the lines of calling and called subscribers. The action of the switching mechanism is governed by operators who are provided with suitable control devices.

Instead of using step-by-step switches, for extending connections from the calling lines to the operators' positions, where the control devices are located, I use a combination of relays. These relays are arranged in groups consisting of what may be termed a set of tens and a set of units relays.

In an exchange of great capacity, wherein a large number of lines is connected, and in order to have a proper distribution of calls, I find it desirable to so arrange that any line can be answered from any operator's position.

In order to provide for such a distribution, I introduce several selections between the calling lines and the operators' positions. A calling line is first connected by a primary selection to what is termed a primary trunk. Each primary trunk terminates in a first selector switch. The primary trunk is connected by a secondary selection to what is termed a secondary trunk and the secondary trunk is finally connected by a tertiary selection to an operator's position.

The calling lines are formed into groups of one hundred lines each. These lines are served by a group of primary trunks. Each primary trunk has an associated set of tens and units relays so as to effect connections with the calling lines. Each set of relays consists of ten tens relays and ten units relays. Each tens relay contains terminals of ten lines and it therefore follows that ten tens relays will serve one hundred lines.

The operation of the tens and units relays form cross combinations so as to enable any line of one hundred to become connected to the primary trunk. Where ten per cent. primary trunking is provided, it will be possible to care for ten calls originating in the same one hundred lines at the same time. The lines will be multipled to the contacts of corresponding tens relays associated with each primary trunk. The secondary trunks are each provided with a set of tens and units relays for effecting connection with the primary trunks. These primary trunks are connected to contacts in the tens relays of the secondary set in the same manner in which the lines are connected to contacts of the tens relays in the primary set. The operation of the tens and units relays in the secondary set form the proper cross combinations so as to enable any one of a group of primary trunks to become connected to the secondary trunk.

The tertiary trunks are each provided with a set of tens and units relays for effecting connection with the secondary trunks. The secondary trunks are connected to contacts of the tens relays of the tertiary set. The operation of the tens and units relays forms cross combinations so as to enable any one of a group of secondary trunks to become connected to the same tertiary trunk or control device.

One feature of my invention relates to the manner in which the various relays in the primary, secondary and tertiary sets are controlled so as to prevent interference and avoid any possibility of tying up a connection during any stage of the selection.

I have also shown my invention applied to trunking between a manual and semi-automatic exchange or exchanges as well as trunking from one semi-automatic exchange to another semi-automatic exchange.

Some of the novel features in connection with the foregoing combinations are as follows:

The method of controlling the stepping of the selector and connector switches.

The method of releasing the various switches either by the calling or called subscriber or by the operator at the manual switch-board or exchange.

The method of controlling and releasing switches in trunking from one exchange to another where the trunks comprise two wires only.

The method of automatically calling or selecting an idle trunk leading to a private branch exchange wherein all of such trunks are listed under the same number.

The method of placing automatic switching mechanism under control of subscribers whose telephones are supplied with local batteries for transmission.

The method of governing the selector and connector switches by the operators' control devices.

While I have shown and illustrated my invention in connection with a semi-automatic exchange, it will readily be seen that this invention is applicable to automatic telephone systems wherein the various switches are controlled by sending or control devices located at the subscribers' stations.

My invention is illustrated in the accompanying drawings, wherein:

Fig. 2 shows a primary trunk with its associated first selector switch.

Fig. 3 shows the circuit of a two wire inter-office trunk for extending connections from one exchange to another.

Fig. 4 shows the circuit of a selector used in conjunction with the inter-office trunk.

Figure 1:
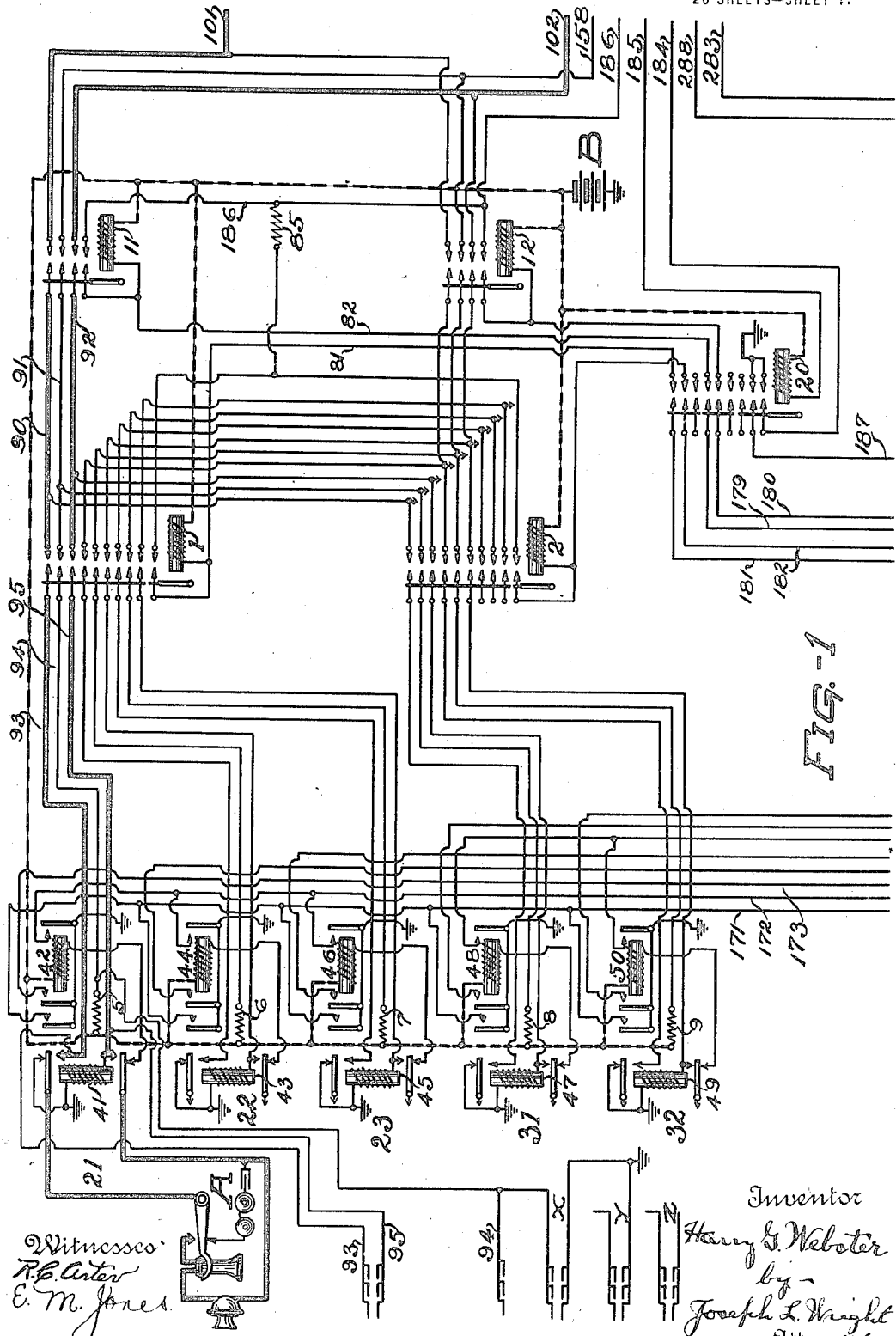
Figure 1 shows a group of subscribers' line circuits and a series of tens and units relays for connecting the lines to primary trunks.

Fig. 4[a] shows a selector used in extending a call from the calling to the called subscriber in the same exchange. This selector can be used either as a second or third selector.

Fig. 5 shows a connector circuit with its associated switch arranged for selective ringing.

Fig. 5[a] shows a private branch exchange connector arranged for selecting the first idle trunk or line of a group.

Fig. 5[b] shows a connector for selecting subscribers whose telephones are provided with local batteries for supplying talking current.

Fig. 5[c] shows a connector which operates in conjunction with a two wire line circuit.

Fig. 6 shows a set of relays and a switch for controlling the primary tens and units relays and primary trunks.

Fig. 7 shows a set of relays and a switch for controlling a set of secondary relays and secondary trunks.

Fig. 8 shows a portion of a set of tens and units relays for connecting the primary trunk to the secondary trunk.

Fig. 9 shows a set of relays and a switch for controlling the tertiary set of tens and units relays.

Fig. 10 shows a portion of a group of tens and units relays for connecting secondary trunks to the tertiary or key-set trunks.

Fig. 11 shows a tertiary trunk and a controlling switch for a group of these trunks.

Fig. 12 shows the operator's keyboard and controlling device for regulating the stepping of the various selector and connector switches.

Fig. 12[a] shows an operator's keyboard and controlling device associated with cord circuits.

Fig. 13 shows a cord circuit used in connecting a toll line or a subscriber in a manual exchange to a subscriber in a semi-automatic exchange.

Fig. 14 shows a selector switch associated with a trunk jack. This switch operates in conjunction with the toll cord circuit.

Fig. 15 shows the arrangement of the various figures when a subscriber in one exchange calls for a subscriber in another exchange.

Fig. 16 shows the arrangement of the various figures when a subscriber calls for another subscriber in the same exchange.

Fig. 17 shows the arrangement of the various figures when a subscriber at the manual exchange or a toll line calls for a subscriber in the semi-automatic exchange.

Referring to Fig. 1, I have shown five subscribers' line circuits, each line being provided with an individual line and cut-off relay.

I have only shown one sub-station at A equipped with apparatus usual in common battery systems.

In the present arrangement, I have shown the five subscribers' lines numbered 21, 22, 23, 31 and 32, so as to show how various combinations of lines can become connected to primary trunks through the same set of relays by having the relays themselves in acting perform certain cross combinations.

For each group of one hundred lines, where ten per cent. trunking is used, there will be ten tens relays and ten units relays for each primary trunk. The tens relays are numbered from 1 to 10, while the units relays are numbered from 11 to 20.

Each one of the tens relays of a set contain the terminals of ten lines so it therefore follows that ten relays will care for one hundred lines. For each additional primary trunk, there will be another set of tens and units relays and in case ten primary trunks are provided, the subscribers' lines will be multipled ten times.

Corresponding contacts in the tens relays of a certain set are multipled and connected to the contacts in the units relays of the same set in the following manner: The multiple of number one set of contacts of the tens relays are connected to contacts in the first units relay, while the multiple contacts of the second set of contacts in the tens relays are connected to the contacts in the second units relay.

When the first tens relay and the first untis relay of one set are energized, it naturally follows that the line connected to the first set of contacts in the first tens relay is connected to contacts in the first units relay.

The contacts in the units relays which engage contacts leading to the multiple connections in the tens relays are connected directly to wires leading to a primary trunk. These primary trunk wires are multipled to the contacts in each units relay of its set. When the first tens and the first units relays are energized, it therefore follows that the line connected to the first set of contacts in the first tens relay is connected to a primary trunk.

If the subscriber whose line is numbered 31 should originate a call, the action of his line relay through the control circuit would energize tens relay 2 and units relay 11, thereby connecting his line to the primary trunk.

Subscriber 32, originating a call, would cause tens relay 2 and the units relay 12 to become energized, thereby connecting his line to the primary trunk.

It is only possible for one tens and one units relay in a certain set to become energized at the same time. When a tens and a units relay of a set are energized, the rest of the relays of the set are prevented from operating and the control circuit is shifted to the next set of tens and units relays to place them in operative condition.

Referring to Fig. 6, a group of relays for controlling the action of the tens and units relays in Fig. 1 is provided to prevent interference in case of simultaneous calls from the same group of line relays. If some provision was not made, then in case of such calls, more than one tens and one units relay could become energized in the same primary set.

There will be ten relays 621 to 630, ten relays 631 to 640 and ten relays 641 to 650. Each of the relays 621 to 630 is individual to a group of ten line relays, while a set of relays 631 to 640 is controlled by the set of relays 621 to 630. Relay 621 controls relay 631 and relay 622 controls relay 632, etc. Each relay in the set 631 to 640 is provided with twelve sets of contacts in order to enable a tens relay in the primary set to be operated, and also to allow any one of the ten units relays in the primary set to become operated. The other contact on these relays is for operating the control or alarm circuit. The contacts of relays 621 to 630, which operate their respective relays 631 to 640, are arranged in a series relation so that only one of the relays 631 to 640 can be operated at the same time.

The tens starting wire belonging to a group of ten line relays is multipled while the units wires of these line relays are individual and are connected in a group in their respective control relay as 631, 632, 633, etc., as the case may be.

For each group of ten line relays, the tens wire will be multipled, enabling any relay of the ten, when operated, to close the circuit of its control relay in the set 621 to 630.

These control relays are operated through the normally closed contacts of a master relay 658, associated with the group of relays 621 to 630. As soon as any relay 621 to 630 of the group is operated, the circuit of the master relay is closed. This latter relay, in operating, opens or disconnects all of the tens starting wires from the group of control relays.

A master relay is also provided for the set of relays 641 to 650. These latter relays are operated by the action of the line relays when the relays 631 to 640 are operated.

The operation of any one of the relays 641 to 650 closes the circuit of the master relay 659, which, in acting, opens the units starting wires leading to the group of control relays 641 to 650.

The controlling contacts for operating the proper units relay in the primary set, when relay 20 is operated, are in a series relation so that the action of only one relay is effective.

By the foregoing arrangement only one of the relays in the set 631 to 640, each representing a group of ten lines, can become energized at the same time. The energized relay connects the units wires of its group of line relays to the windings of the unit control relays of the set 641 to 650 through contacts of relay 659, and as only one of these latter relays, when operated, is effective, it therefore follows that only one tens and one units relay of the primary set can be operated at the same time, no matter how many line relays are energized.

The switch K is a circulator or emergency switch, driven on deënergization of motor magnet 653, which, under normal conditions, takes one step at each call. This switch is provided with three sets of bank contacts and wipers. The wiper and contacts of the portion 660 serves to change the location of the ground connection in relation to the series contacts of the control relays 621 to 630. At each step of the switch K, the ground is shifted from one contact to the one following it. The wiper and contacts of the portion 661 serve to change the location of the ground connection in relation to the series contacts of the control relays 641 to 650. The wiper and contacts of the portion 662 serve to change the order in which the primary trunks are placed in service. In case of any undue delay in a calling line becoming connected to a primary trunk, the switch K will continue to step and change the location of the ground in relation to the series contacts and also place another primary trunk in operative condition.

The functions of this switch K will be fully described in detail later, when describing the operation of the system.

Referring to Fig. 2, the primary trunk terminates in a first selector switch D. This switch as well as the switches shown in Figs. 3, 4, 4ª, 5, 5ª, 5ᵇ, 5ᶜ and 14 are the type shown in Letters Patent 977,936, C. H. North, December 6th, 1910.

Condensers C and C' are inserted in the talking conductors in the usual manner. Relay 201 is operated in series with the resistance coil associated with the calling line when such line is selected by the tens and units relays of the primary set. This relay corresponds to the line relay as it primarily causes the selection of the proper tens and units relays of the secondary set so as to connect the primary trunk to the secondary trunk. Relay 210 corresponds to the line cut-off relay and is operated when the primary trunk is connected to the secondary trunk and disconnects the relay which is energized to operate the tens and units control relays of the secondary set. Relay 203 and the retardation coil R—1 are connected respectively to the grounded or free side of the battery and furnish talking current to the calling subscriber. Relay 212 is a slow acting relay and is controlled by the tip relay 203. The object of this relay is to prevent premature disconnection in case the calling subscriber should accidentally move his receiver hook. Relay 205 is operated when the operator presses the starting button in order to establish a connection. The operation of this relay severs the tip and sleeve conductors and connects the stepping or controlling relay to the tip conductor leading to the operator's position.

It will be noted that the winding of relay 205 is connected permanently to the sleeve conductor leading to operator's position. This relay is held energized throughout the establishment of the connection and all of the impulses for operating the various switches are transmitted over the tip conductor. Relay 206 is the stepping relay which is placed in series with the stepping relay of the sending device, Fig. 12, and serves to operate the rotary magnet 221, causing the switch D to step in a rotary direction and bring its wipers in line with the proper group of contacts. At each stroke of the magnet 221, the vibrating relay 213 is operated, thereby disconnecting 206 from the tip conductor and consequently deënergizing the stepping relay of the sending device. At the first operating of the relay 206, the slow relay 214 is operated and will remain energized during the vibration of relay 206. Immediately after the first group of impulses for operating relay 206 have been transmitted, there is a slight time interval, and contacts of relay 206 remain broken for a sufficient length of time for relay 214 to drop back to its normal position. At this time however the switch D will have rotated and the dropping back of relay 214 closes the circuit of the test relay 207 by ground, through the rotary cam springs 218. These cam springs are closed at the first step of the switch D. The operation of the test relay 207 closes the circuit of the vertical magnet 222 and the switch D will step vertically until an idle contact in the group has been selected.

The same principle for controlling or shifting the various switch circuits is used throughout the system. All of the impulses are transmitted over one conductor and after each group has been transmitted, there is sufficient time interval to allow a slow acting relay to drop back and shift the various control circuits.

204 is the release relay, which is operated when the calling subscriber hangs up his receiver, after the switch D has rotated and stepped vertically. In order to close the circuit of the relay 204, it is necessary that the wipers 231 and 232 engage a set of test contacts whereupon these two wipers become short circuited. Under normal conditions these two wipers are separated, as shown in the drawing. Relay 204 is provided with an extra winding and when this relay is energized the starting conductor 283 is placed in series with this winding. This provision is made so that in case this trunk is the next one in order to be selected by another call before it is entirely released, the current passing through the extra winding over the starting conductor will hold the relay energized and prevent the operation of relay 20, Fig. 1.

Referring to Fig. 3, the two wire trunk selector is shown. That portion to the right of the dot dash lines is located at one exchange, while that to the left is located at the originating exchange. Relay 311 is a slow acting relay and is operated when the first selector switch D picks out an idle trunk selector and places ground on the test contacts. Relay 312 is operated when the switch F starts to restore and serves to place ground on the test contacts in the bank of the first selector D, thereby rendering the trunk busy against other calls until the complete restoration of the switch F.

The relay 303 is slow acting and provided with twin windings. These windings are of comparatively low resistance and are arranged so as to prevent interference to voice currents. It will be noted that one winding is in series with the tip conductor while the other winding is in series with the sleeve conductor.

As soon as the trunk selector F is selected, relay 303 is energized by having the circuit of one winding closed over the sleeve conductor. The impulses, for operating the switch F and succeeding switches, pass through the winding, which is in series with the tip conductor. These impulses, however, do not affect this relay, on account of the circuit being permanently closed through the sleeve conductor winding. This relay 303 is held energized throughout the entire conversation, and when restored, effects the release of the switch F.

Relay 301 is the stepping relay and when operated closes the circuit of the rotary magnet 308, causing the switch F to step in a rotary direction. 306 is the vibrating relay serving to disconnect relay 301 from the tip conductor at each stroke of the magnet 308. 307 is a slow relay operated at the first action of the relay 301 and will remain in an energized condition while relay 301 is vibrating. Relay 307, falling back after a group of impulses have been transmitted, closes the circuit of the test relay 302, thereby causing the switch F to step vertically until an idle trunk has been selected. This trunk selected may be a two wire trunk similar to Fig. 3, or may directly select an idle selector, such as shown in Fig. 4.

304 is the release relay operated when relay 303 is restored and the switch F is in an off-normal position. The operation of relay 304 breaks the circuit of relay 305, thereby severing the tip and sleeve conductors while the switch F is restoring. Relay 305 is operated after the switch F steps vertically and relay 302 falls back after an idle trunk is selected.

Referring to Fig. 4, a trunk selector is shown, which is used for selecting an idle connector. This selector is first picked out by selector such as Fig. 3, and then the connection extended to a connector, which, in turn, selects the called line.

401 is the stepping relay and 403 is the vibrating relay for disconnecting the stepping relay from the tip conductor, at each stroke of the magnet 408. 406 is the slow relay held in an energized condition during the operation of relay 401. 407 is an additional slow relay operated by relay 406. The object of this additional slow relay is to connect ground to the sleeve conductor 416, in order to maintain a circuit of the relay 303, Fig. 3, in an energized condition until the switch H selects a switch J, (Fig. 5). After the group of impulses have been transmitted and relay 406 falls back, the relay 407 falls back and removes ground from the sleeve conductor. By the time relay 407 falls back, connection is established with the connector, (Fig. 5), and the circuit of relay 303 is then maintained closed to ground through the back contacts of relay 514. After the group of impulses has been transmitted, operating the switch H, relay 406, falling back, closes the circuit at the test relay 402, thereby causing the switch H to step vertically until an idle connector has been selected. Relay 405 is operated by the action of relay 402, while the switch H is stepping vertically. Relay 405 is also operated for release purposes, and besides severing the tip and sleeve conductors, also completes the circuit of the release magnet 410, thereby restoring the switch H to its normal position.

Referring to Fig. 4ª, a trunk selector switch is shown at Ha similar to the switch H. The only difference between the two switches lies in the fact that the former switch operates in conjunction with a two wire trunk selector (Fig. 3), while the latter operates in conjunction with a first selector as shown in Fig. 2. In the circuit shown in Fig. 4ª, it is not necessary to provide a relay such as 407; otherwise the circuits are about the same and any differences will be pointed out in describing the detail operation.

Referring to Fig. 5, the connector switch J is shown provided with two wipers, 543 and 544, which engage the tip and sleeve contacts of the called line, over which the conversation is carried on. The wiper 545 serves as a test wiper over which the condition of the called line is found.

The connector switch J is provided with a party line selecting switch S, which serves to pick out the ringing current of the proper character and also controls the release of the switch J. The wipers of the switch S rotate in the direction indicated by the arrow. This switch S takes a number of steps corresponding to the button pressed in the party line row on the keyboard.

501 is the stepping relay for controlling the stepping of the switch J and also the stepping of the switch S. 502 is the slow relay, which remains in an energized condition during the operation of relay 501. After each group of impulses, relay 502 drops back in order to operate the various control relays, to shift the various circuit combinations necessary.

In the selector switches it was only necessary to shift the circuit once from the rotary to the vertical magnets. In the connector circuit however. it is necessary to shift from the rotary to the vertical, from the vertical to the party line switch S, and from the party line switch to the test relay, etc. In order to effect these combinations, several locking or control relays are provided and operated in certain order between each group of impulses. Relay 505 is used to shift from the rotary magnet 516 to the vertical magnet 517. Relay 515 is used for shifting from the vertical magnet 517 to the stepping magnet 536 of the switch S. 509 is the test relay and is only operated in case the called for line is busy. 512 is the relay operated in case the called for line is idle, to cause the stepping of the switch RS and apply generator current to the called line. Relays 519 and 520 are slow relays and serve to furnish interrupted current to the stepping magnet 513 of the switch RS. Springs 527 and 528 of the switch S are shown at normal. These are shifted by the first step of the wipers and are restored by the wipers as they step to their normal point.

The tip and sleeve conductors are separated by condensers in the usual manner, to prevent the battery supply for the called subscriber flowing back over the conductors to the originating point. Battery supply is furnished to the called subscriber through the winding of relay 503 and the retardation coils R—6. The free side of battery is connected to the winding of relay 503, while the grounded side of battery is connected to the coil R—6.

The disks 521 and 523 of the switch RS are used for applying ringing current to the called line, while the disk 522 serves to restore the switch RS to its normal position. Each one of these disks operate a set of associated contact springs as shown in the drawing.

Sources of selective ringing current are indicated at 529, 530, 531, 532, and 533 in this figure, and by similar symbols in Figs. 5ª, 5ᵇ and 5ᶜ. A source of current suitable for supplying busy tone is indicated by 541, in this figure and by similar symbols in Figs. 5ª, 5ᵇ, and 5ᶜ.

Referring to Fig. 5ª, I have shown another connector switch. The particular difference between this and the one shown in Fig. 5 is that here no provision is made for selective ringing, and it is not necessary to provide a switch such as S. Fig. 5 shows the release of connector switch J, dependent upon the action of the switch S. In the present case however, the release of the switch Ja is controlled by the slow acting relay 511ª. Generator current is connected directly to contacts in the switch RSa so that when this switch is operated, generator current of one frequency is applied directly to the called line.

The principle of operating or controlling the switch Ja is the same as for J in Fig. 5, and will be described in detail when tracing a connection from the calling to the called subscriber.

Referring now to Fig. 5ᵇ, a connector circuit is shown for selecting the lines of subscribers whose telephones are equipped with local batteries for transmission.

This connector circuit differs from those previously described as in the present instance the tip relay 503ᵇ is energized when connection is effected with the called line and deënergized when the called party answers. In the previous connectors described, the tip relays were only energized when the called party answers.

Referring to Fig. 5ᶜ a connector is shown for selecting lines of subscribers, wherein a subscriber having one number and a plurality of lines can be selected over the first idle line.

In the previous connectors described the circuits were arranged so that if the called line is busy, the switch is automatically restored. In the present instance, in case the called for line is busy, the switch, instead of releasing will step automatically until an idle trunk or line is found. Special provision is made for releasing the switch or for sending back a busy tone signal to the calling subscriber, in case all of the trunks or lines are busy.

The details in connection with this circuit will be brought out in tracing a connection.

Referring to Fig. 7, each group of one hundred primary trunks will have ten relays 721 to 730, ten relays 731 to 740 and ten relays 741 to 750. The first set of relays mentioned will have a common control or master relay 758. This master relay when energized then prevents any relay of its set becoming operated. The second set of relays mentioned is controlled by a master relay 759, its function being the same as that of relay 758. The relays of the second set mentioned are each provided with twelve sets of normally open contacts. One of these contacts which is permanently grounded serves to control the tens relay of a secondary set such as shown in Fig. 8. Another grounded contact controls the emergency switch or alarm. The remaining ten contacts of each relay are multipled and serve to control the units relays of a secondary set such as shown in Fig. 8. The contacts of the set of relays 721 to 730 which control relays 731 to 740 are in a series relation so as to prevent interference in case of simultaneous calls. In case of such calls, and should more than one relay of the set 721 to 730 become operated, only one will be effective. The contacts of the set 741 to 750 which control the units relays of the secondary set, Fig. 8 are also in a series relation so that in case of simultaneous calls the action of one only is effective. Each of the relays of the set 715, 715ª to 715ⁱ is individual to a secondary trunk Fig. 8 and operated when such a trunk is selected.

Referring to Fig. 8, a set of ten tens and units secondary relays is shown. Relays 801, 802, etc., are the tens relays, while 811 to 812, etc., are the units relays. There will be ten tens relays and ten units relays associated with each secondary trunk. These relays correspond to the tens and units relays in Fig. 1. Instead of a group of lines being connected to contacts in the tens relays, as in the first instance, there will be a group of primary trunks connected.

For each complete set of secondary relays, there will be terminals in the tens relays for one hundred primary trunks. With this arrangement one hundred primary trunks serving one thousand lines can be connected to a secondary trunk. Each group of one hundred primary trunks, however, can be served by a certain number of secondary trunks in the same manner as one hundred lines are served by a certain number of primary trunks. The wires from the primary trunks will be multipled into each group of tens relays of the secondary set in the same manner as the lines are multipled into different groups of tens relays of the primary set.

Relay 804 is operated when connection is effected between the secondary trunk and primary trunk. The operation of this relay connects ground to the locking contacts of the tens and units relays. If, for instance, No. 1 primary trunk were selected, then relays 801 and 811 would become operated, thereby placing relay 804 in series with relay 210, Fig. 2. The operation of relay 210 prevents further selection of secondary trunks and the operation of relay 804 besides maintaining the circuits of relays 801 and 811 closed, also shifts the starting wire to the next trunk in order.

Referring to Fig. 9, relay 902 corresponds to the line relay and is operated by relay 804, placing ground on conductor 37. Relay 910 corresponds to the cut-off relay of a line and is operated when the connection is effected between the secondary and tertiary trunks. There are only three conductors, 936, 935 and 37 extending from the secondary to the tertiary trunk. The control for selecting the proper tens and units relays of the tertiary set is exercised over the third conductor 37.

The circuits for controlling the tertiary set of tens and units relays are similar to the control circuits shown in Figs. 6 and 7. Relays 921 to 930 are responsive to ground being placed on the tens starting wires and cause the operation of the proper tens relays of the tertiary set. The set of relays 921 to 930 is controlled by a master relay 958. The operation of any relay of this set will close the circuit of the master relay which in operating opens the starting wires to prevent interference. There are ten relays in the set 921 to 930, each one of which is common to a group of ten trunks thereby making the complete set common to a group of one hundred secondary trunks.

The set of relays 931 to 940 are controlled by their respective relays in the first set mentioned and when energized connect a group of individual units starting wires to the third set of relays 941 to 950. The operation of any one of these latter relays completes the circuit of the proper units relay of the tertiary set.

The contacts of the first set of relays 921 to 930 which control relays 931 to 940 are in a series relation while the contacts of the set 941 to 950 which control the units relays, Fig. 10, are also in a series relation. These two sets of series contacts are controlled by an emergency or circulator switch "M." In case of a failure in selection, due to an open contact in the series, the switch "M" will start to step and continue to step until the open contact is passed and ground connected beyond the open contact.

Relays 952, 955, 954, 951, 956, 966, and 957 are used for controlling or guarding the selection at different stages and the functions of these relays will be pointed out in detail later on.

Referring to Fig. 10, a set of tertiary tens and units relays is shown. There will be ten tens relays, 1001, 1002, etc., and ten units relays, 1011, 1012, etc., associated with each tertiary trunk or key-set circuit, such as is shown in Fig. 11. Each set of tens and units relays will be controlled by a relay such as 1020. This relay is operated when an idle trunk is selected and serves to close the starting conductors to the tens and units relays of its set.

The ten tens relays contain contacts which are connected to the secondary trunks or terminals in Fig. 8. For a complete set of relays there will be one hundred secondary trunks connected. As each secondary trunk, Fig. 8, is capable of serving one hundred primary trunks or one thousand lines, it therefore follows that the tertiary trunk which has access to one hundred secondary trunks is capable of serving one hundred thousand lines. The group of secondary and primary trunks can be arranged to suit traffic conditions and instead of providing a group of one hundred secondary trunks and having each group serve a certain group of one hundred primary trunks, the grouping can be so arranged that a group of ten secondary trunks can be made to serve the same set of one hundred primary trunks. In such an event the tertiary trunk would then serve ten thousand lines instead of one hundred thousand lines as mentioned in the first instance. The grouping however, can be arranged to suit the exchange requirements as it is only necessary to provide enough secondary and tertiary trunks to allow the calling subscribers to be answered promptly.

Referring to Fig. 11, the tertiary trunk or key-set control is shown. Relay 1101 is operated when connection is effected between the tertiary and secondary trunks. This relay is used for shifting the starting wire to the next trunk in order and also for causing the operation of the signal relay 1106. 1105 is the answering relay operated when the answering button is pressed and serves to connect the operator's telephone set to the tip and sleeve trunk conductors. 1109 is the starting relay operated when the starting button is pressed and serves to operate the device for controlling the selector and connector switches. 1110 is the trunk starting relay and performs the same functions as relay 1109 but reduces the number of impulses between the selector switches and the control device. 1104 is the release relay operated after the connection has been established.

The switch "N" is an emergency switch and operated in case proper connection is not effected between the secondary and tertiary trunks. In case proper selection is not made within a predetermined time, this switch will start to step and continue to step and place the various key-sets in operative condition. Relay 1100 is in series with the starting conductor 916 and operates under normal conditions so as to prevent any action of the control relays 1137, 1138, 1139, etc. In case the starting conductor is open at any point, relay 1100 will not become energized and therefore places the emergency relays in operation and causes the switch "N" to start stepping.

Referring to Fig. 12, the operator's keyboard and control devices are shown. The keyboard consists of seven rows of keys or buttons, there being ten buttons to each row. These first five rows of buttons are of the usual locking and indicating type and arranged so that when any button in a row is depressed it will release the button formerly depressed. The last two strips or rows of buttons are provided with control relays or magnets 1240 and 1241 respectively. With this arrangement the buttons in these two rows are released automatically after the connection has been established. The advantage of this arrangement being that numbers having either 5, 6, or 7 digits can be called in the same system. Systems employing such varying numbers of digits are in existence at present. The switch "TS" is used for indicating the individual button depressed in any row and steps in unison with the selector and connector switches. The switch "SS" is provided with three sets of bank contacts and wipers and serves to connect the rows of buttons in regular order and also to connect the impulses to the tip conductor in a predetermined manner.

The lower bank of contacts of this switch serve to restore the switch "SS" to its normal position when the connection has been established or in case the calling subscriber should hang up his receiver after the call has been started.

Referring to Fig. 12$^a$, the operator's keyboard and control devices are shown to operate in conjunction with cord circuits of a toll or manual switchboard. The operation of the control devices is practically the same as in Fig. 12 and the differences will be noted when tracing a connection.

Referring to Fig. 13, there is shown a cord circuit associated with a manual switchboard and also an answering jack "LJ" and signal A'.

The answering plug is shown at "P" and the calling plug at P'. The control device, Fig. 12$^a$ is associated with the calling plug so that the operator upon receiving a call from a subscriber or a toll line at the manual switchboard, can place the plug "P" into the trunk jack "TJ", Fig. 14, and extend the connection to a subscriber in the semi-automatic exchange or exchanges. The cord circuit is equipped with the ordinary battery supply and supervisory relays and in addition is provided with a relay 1302 for connecting the controlling device or the keyboard. The circuits are so arranged that after the connection has been established the keyboard will be automatically disconnected from the cord circuit.

Referring to Fig. 14, the trunk jack "TJ" is shown terminating in the selector switch "F'." This switch is operated and controlled in a manner similar to that shown in Fig. 3.

I will now describe the operation of my system by tracing a call from the calling to the called subscriber and arrange the circuits in accordance with Fig. 15.

The subscriber at A Fig. 1 removing his receiver, closes the circuit of the line relay 42 through the contacts of relay 41. The action of line relay 42 connects ground to the winding of relay 655 Fig. 6. The function of this latter relay will be described later. The action of relay 42 also connects ground to the winding of relay 621 through the normally closed contacts of relay 658. The action of relay 621 when energized connects ground to the winding of relay 658, thereby energizing it. The action of this latter disconnects the tens starting wires from the control relays 621 to 630.

The action of relay 621 also completes the circuit of relay 631. Now that relay 631 is energized ground from another one of the contacts of relay 42 is connected through the contacts of relay 631 to the winding of relay 641 through the normally closed contacts of relay 659. As soon as relay 641 is operated, it completes the circuit of relay 659. The operation of relay 659 disconnects the units starting wires from the set of relays 641 to 650.

It will now be noted that the operation of line relay 42 causes the operation of relays 621, 631, 658, 641, 659 of the primary control set, and also causes the operation of the relay 654.

The operation of relay 631 closes the circuit of the tens relay Fig. 1 by the following path: ground contacts of relay 631, 181, contacts of relay 20, 81 winding of relay 1 to battery B. The units relay 11, Fig. 1 has its circuit completed by the action of relay 641 by the following path: ground 661, 668 contacts of relay 641, 179 contacts of relay 20, 82 winding of relay 11 to battery B.

Relay 20 of an idle primary trunk Fig. 2 has its circuit completed by the operation of relay 641 in the following manner: As soon as relay 641 becomes energized ground is connected to the winding of relay 20 by the following path: ground 641, 616, 662, of the switch K, 283 contacts of relay 204, 290 contacts of relay 201, 185 winding of relay 20 to battery B.

As soon as the tens and units relays 1 and 11 of Fig. 1 are operated the calling line is connected directly to the primary trunk shown in Fig. 2. As soon as this connection is effected the cut off relay 41 is placed in a series with the retardation coil R—1 by the following path: battery B R—1, 102 contacts of relay 11, 92 contacts of relay 1, 95 winding of relay 41 to ground. The operation of relay 41 disconnects the line relay 42, thereby removing ground from relays 621, 641 and 655. Relay 641 falling back releases relay 659. Relay 621 falling back also releases relays 631, 658, thereby restoring all parts of the control circuit Fig. 6 to normal, except the switch K.

The switch K steps on the retraction of the magnet 653. The circuit of this magnet is completed when the idle trunk is selected as follows: ground contacts of relay 20, 187 contacts of relay 651, 653 to battery B. As soon as the trunk is selected and a relay 20 operated then the magnet 653 is energized and when relay 20 is deënergized after the selection is completed, the circuit of the magnet 653 is broken thereby causing the wipers of the switch K to take one step. In taking this step, the ground connections are shifted in the set of series contacts on relays 621 to 630 and in the set 641 to 650. The shifting of the switch K also connects the starting wire to the next trunk in order.

The relays 1 and 11 are energized practically simultaneously, thereby closing a path from battery through the resistance coil 5, wire 94, contacts of relay 1, 91 contacts of 11, 158 winding of relay 201 to ground, thereby causing the energization of this latter relay which, in turn, closes the following circuit: ground, back contact of 204, wire 242, front contact of 201, 186, contacts of relay 11, through the winding of 11 to battery, and also a path branching from wire 186 through resistance coil 85, contacts of relay 1, winding of 1 to battery. This is a locking circuit for the two relays 1 and 11, holding them energized until this said path is broken by release of the primary trunk, due to the calling subscriber hanging up his telephone. The calling subscriber is now connected to the primary trunk by the circuits shown in heavy lines. Battery and ground for transmission is supplied as follows: battery, winding of R—1, wire 102, contacts of 11, 92, contacts of 1, 95 winding of relay 41 to ground. This energizes relay 41, and the path from wire 95 is continued through the subscriber's line and instrument back to the exchange, front contacts of 41, wire 93, contacts of 1, 90 contacts of 11, 101, winding of 203 to ground. Relay 201 shifts the start wire immediately to the next trunk at its front contact, but this starting circuit is broken by the energization of slow relay 215. This is caused at the time relay 20 pulls up over the following path: ground, contacts of relay 20, wire 184, winding of relay 215 to battery. In the meantime another shift has taken place in this start wire due to the closing of the following path: ground, contacts of relay 20, wire 187, back contacts of 651, winding of magnet 653 to battery. This causes the energization of the magnet 653 and prepares the switch K for a step as soon as the path just described is broken. This path is broken when relay 20 is deënergized, and relay 20 is dropped back due to the deënergizing of the line relay 42 at the time the cut-off relay 41 operated. The dropping back of line relay 42 opens the three paths previously described and relieves relays 621, 658, 631, 641, 659 in rotation. Relay 655 is also deënergized. This places the entire set of control relays shown in Fig. 6 at the disposal of the next incoming call.

The above description is that of a calling line being selected by a primary trunk and is accomplished in a very brief space of time, probably one-fifth of a second. The selection is guarded throughout in the following manner: The pulling up of a line relay energizes relay 655 by ground at the line relay over wire 171, winding of 655 to battery. This relay is shown with double contacts multipled to each other merely as an additional precaution in the guarding of its operation. When 655 pulls up, it closes the circuit of relay 656 from ground and the front contacts of 655, through back contact of 654, the winding of slow relay 656 to battery, causing the latter to become energized. This relay partially closes a path for slow relay 657, so that if relay 654 is energized immediately by the pulling up of relay 631, the path of 657 will be sustained and it will be prevented from retracting. Should relay 631 fail to drop back within a time sufficient to permit the entire selection to be completed, which will be indicated by the relieving of the line relay by the cut-off relay, relay 656 will fall back, as its circuit is opened by the energizing of 654. This will again open the circuit of 657 when the armature of 656 retracts. Should the circuit of relay 657 be opened sufficiently long to permit its armature to make on the back contact, it will connect ground to wire 664, the back contact of 651, 663, the winding of relay 652 to battery. This will energize relay 652 and in turn cause the energizing of motor magnet 653 and the sluggish alarm relay 651. It will also open a path from battery for all the tens and units control relays 621 to 630 and 641 to 650.

The energizing of relay 651 will open the circuit of 652, and this in turn will open the circuit of magnet 653, allowing the switch K to take one step. At the same time, 651 will give an alarm to the attendant that an error has occurred in selection. Should there be an open in either series arrangement of the tens control relays or units control relays or in the starting wire which passes through portion 662 of the switch K, then relay 631 will be held energized for an undue time interval, and the stepping of the switch K will continue until such a defect in either one of the three paths mentioned has been passed by the wipers of the switch K. The bank contacts of each row of this switch are wired in endless rotation so that after the wipers have passed the last contact of the bank they can step to the first.

When the circuit of relay 215 is opened, the starting circuit for the next trunk is then closed over wire 288, back contact of 204ª, back contact of 201ª, wire 185ª to relay 20ª not shown but which is identical to relay 20 of Fig. 1.

When the primary trunk was connected to the calling subscriber relay 203 was energized, and this in turn operated slow relay 212. This latter relay holds the release circuit open until relay 203 is dropped back due to the opening of the calling line at the subscriber's instrument.

When relay 201 was energized it closed the circuit of the secondary line relay 702 (Fig. 7) as follows: ground at the rotary off normal springs 218, 239 front contact of relay 201, 261 back contact of relay 210, 259, winding of relay 702 to battery. This relay 702 in pulling up closes three paths to ground in the same manner as the line relay 42 (Fig. 1). The relays 721, 758, 731 are energized in a similar manner to 621, 658, and 631, 741, 759, 720 are energized in a similar manner to 641, 659 and 20.

The guarding of the secondary selection is similar to that of the primary with the exception, that the magnet 753 is equipped with interrupter springs, which close the circuit of slow relay 766 to cause the automatic stepping of the switch L as long as relay 757 remains deënergized. The energizing of relay 720 closes the circuits of the tens and units relays 801 and 811 of the secondary selection in just the same manner as the circuits of relays 1 and 11 (Fig. 1) were closed. When relays 801 and 811 operate they close the circuit of shift relay 804 over the following path: battery, winding of relay 804, wire 837, contacts of relays 811 and 801, 237, winding of relay 210, 261 make contact of relay 201, 239 to ground at the rotary off normal springs 218. Relay 210 is thus placed in series with relay 804, and in operating breaks the circuit of line relay 702 by opening wire 259. Relay 702 restoring relieves the entire control apparatus of the secondary selection making it available for the next call.

The operation of relay 210 extends one side of the talking circuit from the calling subscriber toward the operator. Relay 804 shifts the starting wire to the next secondary trunk in rotation, and also places a ground on the wire 886, which is the locking circuit for relays 801 and 811. Consequently these are held energized until relay 804 is relieved, and this cannot happen until relay 201 is released, due to the severing of the primary trunk. Relay 804 also places ground on wire 37, back contact of relay 910 (Fig. 9) the winding of relay 902 to battery B, causing the latter relay to become energized.

Relays 921, 958 and 931 and relays 941, 959 (Fig. 9) and relay 1020 (Fig. 10) correspond in their functions to relays 621, 658, 631 and relays 641, 659, and 20 of the primary selection.

That path, closed by the line relay 902 which is common to ten tertiary circuits, connects ground via wire 972 through switch E. S., wire 992, contacts of relay 958, winding of relay 921 to battery B at the back contact of relay 952. The wire connected to the contact on the switch E. S. opposite 992 will be connected through contacts of a relay similar to 958, through the winding of a relay similar to 921, to battery B at the back contact of relay 952. These relays will be a part of the emergency set of tertiary control relays.

In a 100,000 line system the emergency set will consist of one relay similar to 958, a set of ten tens control relays similar to 921 to 930, ten individual wire control relays similar to 931 to 940, one relay similar to 959 and a set of ten units control relays similar to 941 to 950. This emergency set will also have a switch identical to M driven by its own motor magnet similar to 953.

The remainder of the relays shown in Fig. 9, which are used for guarding the selection, may be common to both the standard and emergency set of tertiary selection apparatus. The wires 973 and 971 will be multipled between the standard and the emergency sets, but these will be rendered ineffectual in the set not in use, by having the relays which control them disabled in one set, while the other set is in use, by means of the double throw switch E. S.

The path of the starting wire to the operator's key set is grounded by the operation of relay 941, over wire 16, contacts of switch E. S. wire 916, through the winding of low wound relay 1100, (Fig. 11) wire 1116, wiper of switch N, wire 83, contacts of shift key S. K. lever and back contact of relay 1101, lever and back contact of relay 1104, wire 1090, winding of relay 1020 (Fig. 10) to battery B. The energizing of relay 1020 closes the circuits of the tens and units relays 1001 and 1011 (Fig. 10) and these extend the circuit from the secondary trunk to the key-set. This selection closes the circuit of relay 1101 (Fig. 11) as follows: battery B, winding of relay 1101, 1037, contacts of relays 1011 and 1001, wire 937, winding of relay 910 (Fig. 9) 37, to ground at the front contact of relay 804.

Relay 910 acts as a cut-off relay as it opens the circuit of relay 902 and relieves the entire tertiary selection making it available to the next call. Relay 1101 closes the locking circuit for relays 1001 and 1011 as follows: ground, back contact of 1104, 1140, front contact of relay 1101, 1186 to the locking contacts of relays 1011 and 1001.

The guarding of the tertiary selection is accomplished as follows: When relay 902 was first operated, it energized relay 955, thereby opening the circuit of the extremely slow relay 957, and at the same time, closes the circuit of slow relay 956 from ground to wire 991, back contact of relay 954, 968, winding of relay 956 to battery B. This action partially closes a second path for relay 957, and if relay 954 is energized within a time limit sufficient to allow a proper selection, the circuit of relay 957 will be maintained and so prevent the full retraction of its armature. Relay 954 is energized by the operation of relay 931, and if this is not followed within a certain time by the dropping back of relay 902, the path to relay 957 will again be opened, due to the fact that relay 954 opens the circuit of relay 956 permitting it to drop back. Should the two paths to relay 957 remain open long enough to permit it to drop back, ground at relay 957 will be connected to wire 964, the back contacts of relay 966, winding of relay 952 to battery B. This combination will cause the energizing of slow relay 951 which gives an alarm to the attendant, notifying him that there has been a failure in selection.

Relay 952 will also close a circuit from ground to wire 59, contacts of switch E. S. wire 949, stepping magnet 953 to battery B. This magnet is equipped with interrupter springs, which, when the magnet is operated, closes a path from ground to wire 965, contacts of the switch E. S. wire 65, slow relay 966 to battery B, and thus breaks the circuit of the magnet 953 allowing it to drop back causing the switch M to step forward. The magnet 953 will continue to be energized and deënergized stepping the switch M until its circuit is opened at the slow relay 957, due to a proper selection having been made.

Should the low wound relay 1100 fail to pull up, due to an open in the key-set starting wire, the following circuit will be closed: ground at the front contact of relay 941, (Fig. 9) 16, contacts of switch E. S. 916, back contact of relay 1100, 1120, back contact of relay 1137, 1121, back contact of relay 1138, winding of slow relay 1139 to battery B. This will close a path from the same ground on wire 1121 to the front contact of relay 1139, through the winding of slow relay 1138 to battery B, causing it to become energized. The operation of relay 1138 opens the circuit of relay 1139, and if this relay is fully retracted, a path from the above mentioned ground on wire 1121 passes through the back contact of relay 1139, front contact of relay 1138, which is extremely slow, wire 1136, winding of relay 1137 to battery B. This latter relay is then locked to the ground on wire 1120, and the slow relays 1138 and 1139 are permitted to drop back. Relay 1137 closes the circuit of the stepping magnet 1153 through the back contact of slow relay 1166.

The stepping magnet 1153 is equipped with interrupter springs, which, when the magnet is energized, interrupt its own circuit by energizing the relay 1166. The switch N will continue to step until relay 1137 is dropped back, due to the opening of the starting wire 916 and this can happen only when the cut-off relay 910 has relieved the line relay 902, and this in turn has relieved the tertiary selection apparatus.

The object of the switch S. K. is to shift the starting wire to the next key-set, and thereby disable the key-set with which it is associated. The energizing of relay 1101 closes a circuit as follows: ground through its front contact 1134, winding of relay 1106, to battery. Relay 1106 is thereby energized and closes the circuits of the two signal lamps 1220 and 1222 (Fig. 12) over the following path: ground back contact of relay 1104, 1141, back contact of relay 1109, 1142, back contact of relay 1105, 1143, contacts of relay 1106, 1129, and 1128, signals 1220 and 1222 to battery B. These signals notify the operator that a calling subscriber has been connected to her key-board. She then momentarily depresses the answering button 1217 associated with this key set thereby operating relay 1105, over the following path: ground button 1217, 1130 front contact of 1106, 1133 winding of relay 1105 to battery B. Energization of relay 1105 extinguishes the two signal lamps 1220 and 1222, and connects the operator's telephone set connected to A and B to the calling subscriber over the path shown by the heavy lines. The operator is now able to converse with the calling subscriber, and on receiving the number from him sets up the same on her key board. When relay 1105 is energized, it also closes a circuit from ground back contact of relay 1104, 1141, back contacts of relay 1109, 1142, locking contact of relay 1105, 1133, front contact of relay 1106, 1130 through signal 1221 to battery B. The operator then momentarily depresses the start button 1219, which closes the following circuit: ground, button 1219, 1132, winding of relay 1109, 1036, contacts of relays 1011 and 1001, 936, 836, contacts of relays 811 and 801, 236, winding of relay 205 to battery B. Relays 1109 and 205 are energized in series over one side of the talking circuit. The energizing of relay 1109 opens the locking circuit of relay 1105, and relieves the latter thereby disconnecting the operator's telephone set from the trunk.

Relay 1109 is locked to ground through the back contact of relay 1104, and remains locked until the keyset and secondary trunks are disconnected from the primary trunk. Relay 1109 also closes the circuit of one of the two signals which were lighted when the call first appeared before the operator over the following path: ground, front contact of relay 1109, 1129, signal 1220 to battery B.

Referring to Fig. 2, when relay 205 is energized, it severs the talking circuit so that impulses sent forward in building up a connection will not be transmitted to the calling subscriber. The operation of relay 205 also closes a circuit from battery through retardation coil R—3 wire 258 to talking conductor 226 of the trunk. This battery connection is used with the inter-office trunk circuit as will be shown later. Relay 205 also connects ground to wire 239 to hold relay 210 energized after the switch D has taken the first rotary step, for at this time the ground at the off-normal springs 218 is removed from wire 239. Wire 235 of the talking trunk leading to the operator, is now connected through the front contact of relay 205, wire 252, vertical off-normal springs 217, wire 245, back contacts of 213, 253, winding of relay 206 to ground, and the extension of wire 235, which is 1135 in Fig. 12, is connected, after the first step of the shift switch S. S. through portion 1290, wire 1294 winding of relay 1204 to battery B.

The switch S. S. takes its first step when relay 1109 is energized by the depressing of the start button 1219. The circuit of the stepping magnet 1253 associated with the switch S. S. is closed as follows: ground contacts of relay 1109 switch 1144, contacts of relay 1204, 1230, 1291 contacts of relay 1266, winding of magnet 1253 to battery B. 1253 interrupts its own circuit by energizing 1266, thereby causing the shift switch to step from its normal point to the first contact and connect relays 206 (Fig. 2) and 1204 (Fig. 12) in series, as previously shown, and these two relays are immediately energized. Relay 1204 closes a circuit from ground through its front contacts, 1246, winding of magnet 53 to battery, causing the motor magnet 53 of the test switch T. S. to become energized, but the switch does not step forward until magnet 53 becomes deënergized by the operation of relays in Fig. 2. When relay 206 is pulled up it places ground on wire 250 through the winding of rotary magnet 221 to battery B, causing it to become energized. The armature of magnet 221 at the end of its stroke places ground on wire 247, winding of relay 213, to battery B, and this relay on pulling up breaks the circuit extending between relays 206 (Fig. 2) and 1204 (Fig. 12) permitting them to drop back. This causes the deënergizing of both motor magnets 53 and 221, permitting the switches associated with them to take one step each.

The first step of the switch D is in a rotary direction and in taking this step, it shifts ground from the closed contact of the springs 218 to the normally opened contact. The deënergizing of magnet 221 opens the circuit of relay 213, and it in dropping back again closes the circuit through relays 206 and 1204 over one side of the talking trunk, and they again become energized. These two relays again energize the two motor magnets 221 and 53, and the circuit is interrupted as before. The interruption of these circuits and the stepping in unison of the test switch T. S. with the selector switch D is continued until the wiper of the test switch T. S. finds the contact connected to the depressed button in the first row of the key-board.

Assuming this to have been the fifth button, a circuit will be closed when the wiper of T. S. reaches 1255, as follows: ground, T. S. 1255, contacts of fifth button, 1216, wiper of portion 1291, 1230 front contact of 1204, 1231, winding of magnet 1253 to battery B. When the circuits of the relays 206 and 1204 are broken, the switch S. S. takes one step forward and its three wipers rest on the third set of contacts. A circuit is then closed from ground, contacts of relay 1109, 1144, back contacts of 1204, 1230, wiper of 1291, 1225, off-normal springs 1224 (which were closed at the first step of the switch T. S.) back contact of relay 66, winding of magnet 53 to battery B. This magnet on becoming energized breaks its own circuit by operating relay 66, and thereby causes the automatic stepping of the switch T. S. to its normal point. In passing the last contact, it closes a circuit from ground, wiper 1293, 1228, winding of slow relay 1203 to battery. Relay 1203 in pulling up places ground on 1229, 1231, winding of 1253 to battery, causing magnet 1253 to become energized and when T. S. steps to its normal contact, the switch S. S. steps its wipers to the fourth set of contacts.

In the meantime, however, a secondary impulse has been transmitted at the switch D, which starts the latter to test for an idle trunk. When first operated the relay 206 placed ground on wire 260, through the winding of slow relay 214 to battery B causing it to become energized. Relay 214 is sufficiently slow acting to hold its contacts open during the interruption of relay 206, but does fall back at the end of a series of these impulses and the wipers of the switch D are in line with a row of contacts corresponding to the first digit of the number to be sent. Relay 214, in dropping back, closes a circuit from ground at the rotary off-normal springs 218, wire 241, back contact of relay 204, 243, back contact of relay 214, 244, vertical off-normal springs 216, 249, winding of relay 207 to battery B. Relay 207 becomes energized and places ground on wire 251 through winding of relay 209 to battery B. Relay 207 also closes a circuit from ground, back contacts of relay 213, wire 246, contact of relay 207, 248, winding of vertical motor magnet 222 to battery B. Magnet 222 is energized and at the end of its stroke closes ground on to wire 247, winding of relay 213, to battery. Relay 213 in pulling up opens the circuit just described and permits the switch D to take one vertical step. The wipers 231—232 will now rest on the test contacts associated with the first inter-office trunk. If this trunk is busy these will encounter ground placed there by the wipers of a switch similar to D. This ground is via back contact of relay 213, 234, 232 to test bank contact, and it will pass through the multiple of this bank contact wiper 232, 234, locking contact of relay 207 to battery B, preventing the retraction of this relay. This operation of relay 207 will hold the circuit of magnet 222 closed so that when 213 falls back magnet 222 will again be energized and it will again operate relay 213, causing the switch D to take a second vertical step. This stepping will continue until the switch D finds a bank contact on which there is no ground, and the locking circuit of relay 207 will therefore, not be maintained: it will drop back and open the circuit of magnet 222 to prevent further stepping of the switch D, and will permit relay 209 to fall back and close the talking circuit through to the inter-office trunk.

The vertical off-normal springs 216 and 217 will have been opened at the first vertical step of the switch D, and will thereby have severed relays 206 and 207 from the first selector circuit.

When the test wipers 231—232 find the bank contacts associated with an idle inter-office trunk, the following circuit is closed: ground, back contacts of relay 213, 234, 232, 313, back contacts of relay 312, winding of slow relay 311 to battery B. Relay 311 becomes energized and disconnects relay 312 from one of the transmission wires. This relay 311 remains energized until the wipers of the selector switch D leave the contacts 315, 316, and 313 at the time of release. After an idle trunk is selected, the circuit of relay 303 is closed as follows: R—3, 258, front contact of 205, 226, back contact of 209, 228, 230, 316, (Fig. 3) one winding of 303, 338, back contact of 305 to ground. Relay 303 will remain energized throughout the building of a connection and during conversation. The relay 1204, (Fig. 12) will now become energized in series with relay 301, (Fig. 3) as follows: battery B, winding of relay 1204, 1294, fourth contact of switch 1290, 1135, its extension 235 (Fig. 2) 225, back contacts of relay 209, 227, 229, 315, winding of relay 303, 337, back contact of 305, 343, winding of relay 301, 330 back contact of 306, 335, front contact of relay 303 to ground. Relay 1204 will control the action of the magnet 53 in a manner identical to that explained for the first digit sent. Relay 301 on pulling up will energize rotary magnet 308, and this in turn will energize the interrupting relay 306, which will break the series circuit of the two relays 301 and 1204. The second digit of the number to be sent will be regulated by the rotary stepping of the switches F and T. S. just as previously explained, and the wipers of switch F will be brought in line with a row of contacts representing a group of trunks leading to a distant exchange. When the relay 301 first became energized, it closed the circuit of the slow relay 307, which remained energized during the series of impulses just mentioned. At the end of this series of impulses, relay 307 drops back and closes a circuit from ground at the rotary off-normal springs 325, (which were closed by the first rotary step of the switch F), 318, back contact of relay 307, 339, back contact of relay 304, 322, vertical off-normal springs 323, 326, winding of relay 302, to battery B. Relay 302, operating in turn energizes the vertical magnet 309 as follows: ground, front contact of relay 302, 327, back contact of relay 306, 321 winding of magnet 309 to battery, causing a vertical step of switch F. Magnet 309 at the end of its stroke pulls up interrupting relay 306.

If the first contact tested is grounded by another switch, F, resting on its multiple contact, relay 302 will be held energized until the switch can take another step. The switch F will continue to step in a vertical direction automatically until an idle trunk leading to a third office is found. This trunk contact will then be made busy by placing ground through the back contact of relay 304, 341 front contact of relay 306, 331, 313, back contact of relay 312, winding of slow relay 311 to battery B. The relay 311 is high wound so as not to interfere with the testing by another switch.

At the first vertical step of the switch F, the vertical off-normal springs 323 are opened and the springs 324 closed, so that when relay 302 is deënergized, due to the finding of an idle trunk, a circuit is closed from battery B, through winding of relay 305, 344, back contact of relay 302, 340 springs 324, 320, back contact of relay 304, to ground.

The energizing of relay 305 extends the transmission and signal wires 315 and 316 through to the next inter-office trunk, which is identical in operation to the one shown in Fig. 3. Ground for holding relay 303 energized is removed from the wire 338 at the back contact of relay 305, but as the wiper 334 is resting on another inter-office trunk, ground is connected to wiper 334 through the back contact of relay 305 of the next trunk.

While the switch F is testing vertically for an idle trunk, the switch T. S. is returning to its normal point, and on passing the last contact closes the circuit of relay 1203 and steps the shift switch S. S. to its sixth contact. This switch remains in this position while the third digit of the called number is sent, and the switch of the second inter-office trunk is rotating.

The finding of the depressed button in the third row by the switch T. S. again steps the switch S. S., causing its wipers to rest on the seventh set of contacts while the switch T. S. is returning to normal and the selector switch of the second inter-office trunk is testing vertically for an idle local selector. The relays 303 of the inter-office trunks used are held energized by ground through the back contact of relay 404 (Fig. 4) 411, 416, 334, 338 winding of relay 303 back to battery B, through R—3 of the first selector. Rotary impulses for the switch H of the local selector are controlled over the extension of wire 235 (Fig. 2) 415 (Fig. 4) 440, vertical off-normal springs 424, 420, back contacts of relay 403, 443, winding of relay 401 to ground. Relays 401 (Fig. 4) and 1204 (Fig. 12) regulate these rotary impulses just as the rotary impulses in preceding switches.

408 is the rotary magnet and 403 is the interrupting relay which severs the circuit of relays 401 and 1204 to regulate the impulses. The energization of relay 401 causes the operation of slow relay 406, corresponding to relay 214 in the first selector and relay 307 in the inter-office selector. After the first rotary impulse the following circuit is closed: ground, rotary off-normal springs 425, 430, front contact of relay 406, 438, winding of relay 404 to battery B. Relay 404 is locked over wire 413, 331, back contact of relay 306, 341, back contact of relay 304 to ground, until the wiper of the inter-office trunk switch F leaves the contact 413. Relay 407 holds ground on the conductor until the wipers of the switch H are resting on the contacts associated with the connector to be used, at this time ground is placed on same side of the trunk through a retardation coil in the connector circuit.

At the first vertical step of the switch H, the springs 423 and 424 are operated to cut off the selecting apparatus of the switch H. The rotary stepping of the switch H is caused by impulses regulated by the fourth row of keys, and at the end of these impulses the switch S. S. is stepped to the ninth set of contacts, while the switch H is traveling vertically and the switch T. S. is restoring to normal.

Switch T. S. in passing its last contact, steps the switch S. S. to its tenth set of contacts, connecting the fifth or tens row of keys to the switch S. S.

The local selector has now selected a connector such as shown on Fig. 5, and relay 1204, (Fig. 12) is placed in series with relay 501, by the following path: 1135, 235, (Fig. 2) through Figs. 3 and 4 to 537, 564, back contacts of relay 512, 568, back contacts of relay 507, 588, winding of relay 501, 587, back contacts of relay 509, 572, back contacts of relay 514, to ground. Relay 501 connects ground to the winding of slow relay 502 and it remains energized during the sending of any series of impulses regulated by relay 501. Relay 501 also connects ground to 579, back contact of relay 515, 580, back contact of relay 505, 562, winding of rotary magnet 516 to battery B. The armature of 516, at the end of its travel, closes the circuit of relay 507, thereby interrupting the circuit of relays 501 and 1204, causing the regulating of the impulses of the tens digit just as previously described.

When slow relay 502 was first energized, it connected ground to 552, off-normal springs 527 of the party line switch S, 557, winding of relay 504 to battery B. Relay 504 is energized and locked by the ground placed on bank contact 539 by the local selector. This locking circuit is through the back contacts of slow relay 511 so that relay 504 is controlled both by the local selector and by the called party.

When relay 502 is retracted at the end of the first series of impulses, it places ground through its back contact, front contact on relay 504, 566, vertical off-normal springs 526, 585, winding of relay 505, to battery B. This relay 505 is energized and locked through its front contact, 586, back contact of relay 508, 561, to ground, at the rotary off-normal springs, (which are closed by the first rotary step of the switch J). Relay 505 shifts the stepping circuit of relay 501 from the rotary magnet 516 to the vertical magnet 517, so that the next impulses regulated by 501 will operate the latter instead of the former. This relay 505 also closes a circuit from ground to 582, winding of relay 510 to battery B, causing this latter relay to become energized so as to break the wiper circuits while the switch J is traveling over the busy contacts.

At the end of the series of tens impulses, the switch T. S. is again stepped to normal and in so doing it shifts the switch S. S. to its twelfth contact. When a button was first depressed in the sixth row of keys, the common locking bar of this row mechanically forced clutch 1242 over sufficiently to connect ground to winding of relay 1245, and this relay became energized and connected wire 1211 through the front contact of relay 1245, 1223, to the twelfth contact of portion 1291. It also closed wire 1135 via 1235, front contact of relay 1245, 1200 to the twelfth contact of the portion 1290 so that the units impulses can be controlled over the same circuit from 1135 back to the connector.

The depression of the party line button also connected ground to winding of relay 1244 and so connected the wire 1210 to the fourteenth contact of the portion 1291 of the switch S. S. and also connected wires 1235 and 1201 to the fourteenth contact of the portion 1290. The units impulses are regulated by relays 501 and 1204 in the manner already described. In this instance, the action of relay 501 causes the vertical magnet 517 to be energized, thereby stepping the switch vertically to the contacts of the line called. Slow relay 502 is again energized at the beginning of the series of tens impulses, but at this time changes no circuits. At the end of the tens impulses relay 502 again falls back and closes a circuit from ground through the front contact of relay 504, 566, the vertical off-normal springs 526 (which were shifted by the first vertical step of the switch J) 549, off-normal springs 528, 550 winding of relay 515 to battery B. Relay 515 is energized and is then locked through its winding and locking contact, 586, back contact of relay 508, 561 to ground at the off-normal springs 525.

The operation of relay 515 shifts the stepping circuit of relay 501 from the vertical magnet 517 to the motor magnet 536, so that when relay 501 regulates the impulses of the party line row, ground is placed on wire 579, front contact of 515, 592, winding of 536 to battery B, and the wipers of the switch S are advanced to select the proper frequency to be used in ringing. Upon the first step of the switch S off-normal springs 527 and 528 are shifted from their normally closed contacts to the normally open contacts. Slow relay 502 is energized at the first impulse which steps the switch S, and closes a circuit from ground through its front contact, 552, 551, winding of the extremely slow relay 506 to battery B.

Throughout this description I have used terms such as slow relay and extremely slow relay. I have used these terms to bring out the point that some relays are used in this system which are relatively slower than others.

This relay 506 maintains the circuit of wiper relay 510 closed while the busy test is being made and also partially closes a circuit for the busy test so that when relay 502 retracts at the end of the party line impulses the test circuit is then completed by the energizing of relay 508. Relay 508 is energized by the following path: ground, back contact of relay 502, front contact of relay 504, 566, off-normal springs 526, 549, 548 winding of relay 508 to battery B. Current is removed from the circuit of 506 as soon as relay 502 retracts, but 506 does not drop its armatures immediately due to its sluggish action, and a circuit is closed from the wiper 545, 547, front contact of relay 506, 584, front contact of relay 508, 573, winding of relay 509, to battery B.

If the called line is busy the wiper 545 will find ground on the bank contact, placed thereon through the back contact of relay 510, of some other connector. This ground will energize relay 509 over the circuit just traced, and it will be locked through its locking contact 565, back contact of relay 511, front contact of relay 504, 539 to ground at the local selector. Relay 509 will break the circuit between relays 501 and 1204 and will hold relay 510 energized until the connector is released by the calling party hanging up, and also place a busy tone from 541 back to the calling subscriber over one side of the talking trunk, to notify him that the called line is busy. If the called line is not busy, relay 509 will not pull up, and when relay 506 drops back, the circuit relay 510 will no longer be maintained and it will retract. The cut - off relay of the called line will be operated from ground through the back contact of relay 510, 546, 545, bank contact 599, winding of the cut-off relay to battery B. The retraction of relay 510 will also permit the energizing of the relay 512 which starts the ringing of the called subscriber. The circuit of relay 512 is as follows: battery B, winding of relay 512, 569, back contact of relay 510, 577, front contact of relay 508, 561 to ground at the off-normal springs 525. This relay operating will be locked from wire 561 to the same ground and closes the circuit of the motor magnet 513 of the ringing switch R. S. as follows: battery B, winding of relay 513, 590, front contact of 512, 571 front contact of relay 508, 589, winding of slow relay 519 to ground. The winding of relay 519 is of considerably higher resistance than that of magnet 513, consequently relay 519 is energized while the motor magnet 513 is not. Relay 519 on pulling up energizes the slow relay 520, and it in pulling up shunts out relay 519 by direct ground causes the energizing of magnet 513. Relay 519 drops back and in so doing, opens the circuit of relay 520. Magnet 513 will not remain energized when the ground at the front contact of 520 is removed and the switch R. S. will take one step. Relay 519 however, will pull up and again energize relay 520, repeating the operation just described.

During part of a rotation of the cams of R. S. the springs 521 will place ground on one side of the called subscriber's line, and 523 will place the generator selected by the switch S to the other side of his line. During the remainder of a rotation of R. S., ground and generator will be removed from the called line, and ground through the retardation coil R—6 will be placed on one side of the line, while battery, through the winding of relay 503, cam springs 521, will be placed on the other side. The connection to ground through R—6 is closed one step in advance of the battery connection through relay 503, so that the called line is discharged of any raised potential due to ringing current. The switch R. S. will continue to step and periodically place ringing current to the called line until the subscriber removes his receiver. During a non-ringing interval, relay 503 will then be energized over the following circuit: battery B, winding of relay 503, cam spring 521 wire 583, back contact of relay 510, 543, through the called subscriber's line and instrument, wiper 544, back contact of relay 510, 566 cam springs 523, 555, winding of R—6 to ground. When 503 is energized, it operates slow relay 511 and also places ground through the winding of retardation coil R—4, wire 564, to talking conductor 537. The impedance of R—4 is arranged to balance that of R—5, and the purpose of R—5 is to hold the twin wound relays such as 303 of the inter-office trunks energized. Relay 511 becoming energized opens the locking winding of relay 504. Relay 504 in dropping back places ground from the cam springs 525, wire 560, back contact of relay 514, 575, to wiper 539 to guard these contacts against selection by a local selector until the connector has been fully restored. Relay 504 in dropping back partially closes the release circuit but this circuit is open at the back contact of relay 511 until the called subscriber hangs up his receiver. The dropping back of relay 504 also disables the ringing circuit and opens the circuit of relay 508. Relay 508 in dropping back opens one circuit to magnet 513, but a parallel circuit was closed at the first step of the switch R. S. and is opened when the switch R. S. has completed one rotation.

The apparatus is now in condition for conversation between the calling and called subscribers, and in the connector circuit relays 511 and 503 only are energized. Relay 205 has been deënergized during the ringing of the called party, as will be explained later. Assuming that the called party replaces his receiver before the calling party, he will release all apparatus to the first inter-office connector used in the following manner: by replacing his receiver he deënergizes relay 503 and this in turn relay 511, thereby closing a circuit from the off-normal springs 525, 561, back contact of relay 504, back contact of relay 511, 567, back contact of relay 507, 581, portion 535 of the switch S, 592 winding of magnet 536 to ground. This energizing of magnet 536, will in turn break its own circuit by energizing relay 507. The switch S will thus be caused to step forward until the wiper of 535 connects wire 581 to normal contact 540, at which point the ground, which is then on 581, will pass through the winding of relay 514 to battery B. Relay 514 will open the impulse circuit of relay 501 to prevent false impulses during release and will close the circuit of the release magnet 518 as follows: ground at the off-normal springs 525, 560, front contact of relay 514, 591, winding of magnet 518 to battery B. This will cause switch J to return to normal and the circuit of magnet 518 will be broken at the springs 525. Relay 514, will, however, remain locked to the ground through bank contact 539 until the preceding selector is restored. Relay 514 will also operate relay 510 to sever the wiper circuit while the switch is returning to normal. Release relay 514 also removes ground from the winding of R—5 thus relieving the relays 303 of the inter-office trunks, by deënergizing them.

Referring to Fig. 3, it will be noted that the deënergizing of relay 303 closes a circuit from ground at the off-normal springs 325, 318, back contact of relay 303, 319, winding of relay 304 to battery B, causing the later relay to become energized. This relay removes ground from relay 305, permitting it to retract, and close the following circuit: ground, front contact of relay 304, 328, back contact of relay 505, 329, winding of release magnet 310 to battery B. The operation of magnet 310 will restore the switch F to normal, thereby opening the circuit of relay 304. Relay 303 in retracting, severs the circuit of the stepping relay 301 to prevent false steps of the switch F during release.

The second inter-office trunk will have release simultaneously to the first in the same manner.

When the wipers of the switch F of the first inter-office trunk leave the contacts of the second inter-office trunk, relay 311 is released restoring all apparatus of the second trunk to normal. Relay 311 of the first inter-office trunk used will not drop back until the wipers of the first selector leave its contacts. As soon as the wiper of the switch F of the second inter-office trunk leave the contacts of the local selector, (Fig. 4) it opens the locking circuit of relay 404, permitting it to fall back. Relay 404 in falling back closes a circuit from ground at the springs 425, 430, back contact of relay 406, 439, back contact of relay 404, 437, winding of relay 405 to battery B. The operation of relay 405 will open the wiper circuits and close a circuit from ground, back contact of relay 402, front contact of relay 405, 429, release magnet 410 to battery B.

By this method of release, the called subscriber controls the release of intermediate switches. In case the called subscriber fails to answer and the calling subscriber replaces his receiver, the release is initiated at the first selector. Referring to Fig. 2, the relay 203 will drop back opening the circuit of slow relay 212, and this will close a circuit as follows: ground, back contact of 213, 234, 232, bank contact wiper 231, 233, back contact of relay 209, 256, back contact of relay 212, 255, winding of relay 204, to battery B. Relay 204 places ground to the winding of relay 209 to battery B, causing this relay to sever the wiper circuit to prevent trouble during the return of the switch D to normal. Relay 204 will be locked from its locking contact 241 to ground at the springs 218 until the switch is fully restored. The circuit of the release magnet is closed as follows: battery B, winding of magnet 240, 262, front contact of relay 209, 256, back contact of relay 212, 255, locking contact of relay 204, 241 to ground at the springs 218. The energizing of relay 204 removes ground from the locking circuit for the relays 1 and 11 (Fig. 1). These relays now fall back and sever the talking trunk and signal wire 158, thus causing the deënergizing of relay 201 and the cut-off relay 41. Relay 201 in dropping back shifts the starting wire back to normal so that this trunk may be used in proper rotation by the primary selection apparatus. The starting wire, however, passes through an extra winding of relay 204, so that it is not fully closed until this relay has dropped back.

When the switch D is released and the wipers leave the contacts of the inter-office trunk shown in Fig. 3, relay 311 is deenergized and also relay 303. Relay 303 restoring, causes the release of the switch F as previously described, with the exception, that when relay 304 is energized, due to the dropping back of relay 303, it closes a circuit from ground, front contact, 317, 314, back contact of relay 311, winding of relay 312 to battery. Relay 312 is energized and places a ground on the test contact over 313 to guard this switch against selection by a traveling first selector. When the wipers of the switch F leave the banks of the second inter-office trunk used, it causes the release of the latter in a manner identical to that just described.

The local selector shown in Fig. 4 will be released just as when the called subscriber hangs up first.

If the called subscriber has failed to answer the connector in Fig. 5, is released as follows: wipers of the switch H leaving the bank contacts of the connector open the locking circuit of relay 504 and this relay dropping back disables the ringing as already described, and the magnet 513 will step until the switch R. S. restores to normal. The switch S will step to its normal point and cause the release of the connector by operating release relay 514 as already described. The bank contact 539 will be guarded against selection by ground connected as follows: ground at 525, 561, back contact of relay 504, back contact of relay 511, 567, back contact of relay 507, 581, 535, 540, locking contact of relay 514, 575, back contact of relay 504 to bank contact 539. Referring to Fig. 12, I will now explain the release of the operator's apparatus which occurred after the connector shown in Fig. 5 was operated. After regulating the impulses in the P. L. row, the test switch T. S. in passing its last contact, caused the shift switch S. S. to step to its sixteenth contact. When this contact is reached the circuit of relay 1104 is closed as follows: ground contacts of relay 1109, 1144, contacts of relay 1204, 1230, 1291, 1123, winding of relay 1104 to battery B. The operation of relay 1104 removes ground from the locking contact of relay 1109 and this latter relay falling back, connects ground to portion 1292 of switch S. S. and so maintains the circuit of relay 1104 closed. The operation of relay 1104 connects ground to winding of magnet 1253 through the back contacts of relay 1266. Relay 1104 will remain energized and cause the stepping of switch S. S. until the wiper of portion 1292 reaches its normal position. While relay 1104 is energized it will connect the starting wire to the next trunk in order and also connect ground to the winding of magnets 1240 and 1241 (Fig. 12). The energizing of these two magnets released the common locking bar of the P. L and U rows of keys, restoring the buttons which were depressed to normal. When the locking circuit of 1109 was opened by the deenergizing of 1104, relay 205 (Fig. 2) which was in series with 1109, dropped back, thereby closing the talking circuit through from the calling subscriber toward the called subscriber. Relay 205 in dropping back also opened the circuits of relays 210 and 804, which were energized in series. Relay 210 partially closed the circuit of line relay 702 of the secondary selection so that when the switch D is restored to normal, this line relay 702 again becomes available. Relay 804, on being deënergized, opens the locking circuit of the relays 801 and 811, causing them to disconnect the secondary trunk and also shifts the starting wire so that this secondary trunk may be used thereafter. Relay 804 in dropping back opens the circuit of relays 910 and 1101 which were in series. Relay 1101 in dropping back opens the circuit of relay 1106 and also the locking circuit of the relays 1001 and 1011, deënergizing all of these and rendering the tertiary trunk available for the next connection. Relay 1101 also shifts the starting wire back to normal.

It will be noted that all apparatus used in talking and signaling between the primary trunk and the operator may be released by opening the circuits of relays 1109 and 205, at either or at both ends. Suppose the calling subscriber replaces his receiver during the time that impulses were building up a connection. He would release the primary trunk and first selector as already described and deënergize the relay 201, thereby breaking the circuits of relays 210 and 1109 at the front contact of relay 201 and cause the release of the intermediate apparatus as just described.

In case a false call, due to a short circuited line, comes to the operator, she can dispose of it by setting up a predetermined number, for instance 0, in the 100 M row and depressing the button 1218 instead of 1219. This will energize relay 1110 and lock the same and then energize 1109 and 205 as before. The switch S. S. will step to its first contact and regulate the impulses of the 100 M row, and when the depressed button is found, the switch S. S. will step to its second contact. The test switch will step to normal, and in passing its last contact will step the switch S. S. to its third contact, and the wiper of the portion 1292 will then connect ground from the front contact of relay 1110 to the winding of relay 1104 and cause the switch S. S. to rapidly restore to normal, and release the connection as before.

I will now trace a call from a calling to a called subscriber in the same exchange, using the circuits arranged according to Fig. 16. To avoid useless repetition, I will refer to the preceding description and point out the principal differences. The calling subscriber will be connected to the operator as already shown. The called number will consist of but five digits in this case, and the operator will depress keys in the 100 M, 10 M, M, H and T rows only. Since no buttons are depressed in the U and PL rows, the relays 1245 and 1244 will not be energized and the circuit of the impulse wires 1135—1235 will be broken at front contacts of these relays, but the restoring circuit for the switch T. S. will be closed through their back contacts, so that after the first five digits have been sent, the switch T. S. will continue to rotate and with each rotation step the switch S. S. until its wipers reach the sixteenth contact, at which time the switch S. S. will be restored to normal, just as in the connection previously described.

The first set of impulses regulated, corresponding to the button depressed in the first row, will cause the switch D, (Fig. 2), to step in a rotary direction and come in line with a row of contacts representing the first digit of the number called. The switch D will then automatically step in a vertical direction to find an idle local selector such as shown in Fig. 4$^a$. 401$^a$ is the rotary stepping relay, which, by energizing rotary magnet 408$^a$, causes the switch H—a to step in a rotary direction and come in line with a row of contacts representing the second digit of the number called. Relay 402$^a$, by energizing vertical magnet 409$^a$, will cause the switch to step vertically to find another idle local selector similar to itself. With the exception of relay 407 and its connected wires shown in Fig. 4, the circuit shown in Fig. 4$^a$ is identical to the former.

The second local selector will pick an idle connector such as shown in Fig. 5$^c$. The rotary stepping of the switch J—c will be effected by relay 501$^c$ and rotary magnet 516$^c$, and the vertical stepping by the shifting from the rotary magnet to the vertical magnet 517$^c$ by relay 505$^c$, just as in the connector, Fig. 5. 502$^c$ is the slow secondary relay corresponding to relay 502. 504$^c$ is the bank guarding relay corresponding to relay 504 and is energized by the action of relay 502$^c$. Relay 505$^c$ is energized by the first retraction of relay 502$^c$. When relay 502$^c$ is energized by the first of the tens impulses, it closes, (after the first vertical step of the switch J—c), the circuit of relay 506$^c$. Upon retraction at the end of this series of impulses, relay 502$^c$ closes the circuit of 508$^c$. Before 506$^c$ can drop back a test circuit is closed from the wiper 544$^c$, 547$^c$, front contact of relay 506$^c$, 584$^c$, front contact of relay 508$^c$, 573$^c$, winding of relay 509$^c$, to ground. If the wiper 544$^c$ finds battery on the test contact due to the called line being busy, relay 509$^c$ will be energized and locked over wire 547$^c$ and will hold the relay 510$^c$ energized and thereby prevent the closing of the connection through to the called party and at the same time will place a busy tone from 541$^c$ back over one side of the talking trunk to the calling subscriber. If the called line is not busy relay 509$^c$ will not pull up, and when relay 506$^c$ drops backs, the circuit of relay 510$^c$ will be opened. Relay 510$^c$ falling back will close a circuit from ground at the rotary off-normal springs 525$^c$, 561$^c$, front contact of relay 508$^c$, 577$^c$, contacts of relay 510$^c$, 569$^c$, winding of relay 512$^c$ to battery B. The operation of relay 512$^c$ will open the circuit of relay 501$^c$. The switch R. S. c will be caused to rotate by the slow relays 519$^c$ and 520$^c$ just as in the connector Fig. 5. The ringing switch R. S. c will periodically place current from ringing source 529$^c$ and battery from B to the called subscriber's line. During a non-ringing period, battery through retardation coil R—6c and ground through supervisory relay 503$^c$ are substituted for the ringing generator and battery through the resistance V, so that during a non-ringing period, the called subscriber may energize relay 503$^c$. The action of relay 503$^c$ will operate relay 511$^c$ and disable the ringing circuit by dropping back relay 504$^c$. Switch RSc will step to its normal point and come to rest.

Battery supply for transmission is supplied to the called subscriber through the windings of coil R—6c and relay 503$^c$. When the called subscriber hangs up his receiver, he deënergizes relay 503$^c$, thereby releasing relay 511$^c$, closing the circuit of relay 514$^c$ by ground at the springs 525$^c$, 561$^c$, back contact of relay 511$^c$, 540$^c$, winding of relay 514$^c$ to ground. Relay 514$^c$ energizes relay 510$^c$ to sever the wiper circuit, locks itself to ground at the bank contacts 539$^c$ and energizes release magnet 518$^c$ by ground at the springs 529$^c$. The release of this connector, by a calling subscriber is identical to that described for a connection according to Fig. 15. In the present instance the called subscriber does not control the release of the switches excepting his own connector which is released as previously described.

The line discharge of the called subscriber's line, after each ringing period is effected in a slightly different manner than that of Fig. 5. During the time that generator current is flowing from 529$^c$ over 554$^c$, 543$^c$, to the called subscriber, the relay 503$^c$ is shunted by ground, and the springs 521$^c$ are so arranged that this ground is connected momentarily to the called subscriber's line before the portion 554$^c$ is closed to relay 503$^c$, so that the latter can not become energized by the line discharge from the called line.

Fig. 5$^b$ shows a connector used in calling for subscribers having local batteries at the sub-station for transmission and may be substituted for Fig. 5 or Fig. 5$^c$ in the connections just traced. The switch J—b, Fig. 5$^b$, is stepped in a rotary and vertical direction by the stepping relay 501$^b$ in a manner similar to that already shown. The secondary relay 502$^b$, at the end of the tens impulses, operates 505$^b$. After the first vertical step of the switch J—b, relay 502$^b$ being energized and the vertical off-normal spring 527$^b$ shifted, allows the slow relay 506$^b$ to be energized. When relay 502$^b$ retracts after the series of units impulses, it closes the circuit of relay 508$^b$ to ground, back contact of 502$^b$, front contact of 504$^b$, 566$^b$, springs 528$^b$, 548$^b$, 508$^b$ to battery B. With relays 506$^b$ and 508$^b$ energized, a test circuit is closed from the wiper 545$^b$, 546$^b$, front contact of relay 506$^b$, front contact of relay 508$^b$, winding of relay 509$^b$ to battery B. Should the wiper 545$^b$ find a grounded test contact, due to a busy line, the relay 509$^b$ is energized and locked to ground through bank contact 539$^b$, and held so until the connector is released by the calling subscriber hanging up his receiver. Relay 509$^b$ places a busy tone to one side of the talking trunk to notify the calling subscriber that the line is busy. If the called line is not busy, 509$^b$ will not be energized and upon the retraction of relay 506$^b$, the circuit of relay 510$^b$ is broken. As soon as relay 510$^b$ closes the circuit through to the called line, supervisory relay 503$^b$ is energized from battery through its winding, 554$^b$, back contact of relay 510$^b$, 543$^b$, subscriber's ringer coils, (which in this case have no condenser in series with them), back over his line, wiper 544$^b$, 556$^b$, cam springs 523$^b$, 555$^b$, winding of coil R—6b to ground. The operation of relay 503$^b$ energizes relay 512$^b$ to ground at the springs 525$^b$, front contact of relay 503$^b$, 577$^b$, back contact of relay 510$^b$, 569$^b$, winding of relay 512$^b$ to battery B. Relay 512$^b$ on operating, closes the circuit of the motor magnet 513$^b$ of the ringing switch, and this switch rotates and steps its cams. During the ringing portion of a rotation of the ringing switch, relay 503$^b$ is held energized by ground at the cam springs 521$^b$, this ground also forming one side of the ringing circuit, the other side being from ground, ringing generator 529ᵇ, cams 523ᵇ, 556ᵇ, back contact of relay 510ᵇ, wiper 544ᵇ to the called subscriber's instrument.

During a non-ringing period, relay 503ᵇ may be deënergized by the called subscriber removing his receiver and opening the ringer circuit. The deënergization of 503ᵇ now closes a circuit from ground at the springs 525ᵇ, 561ᵇ, back contact of relay 503ᵇ, front contact of relay 512ᵇ, 570ᵇ, winding of slow relay 511ᵇ to battery B. The operation of relay 511ᵇ opens the locking circuit of relay 504ᵇ just as in the preceding connectors and thereby opens the circuit of relay 508ᵇ and also disables the ringing circuit. The line discharge is effected by holding the springs 521ᵇ closed a little longer than the make springs at 523ᵇ.

The release of this connector by the called subscriber is caused by the operation of relay 503ᵇ when the receiver is replaced. The operation of relay 503ᵇ energizes relay 511ᵇ and closes the circuit from ground at 525ᵇ, 561ᵇ, back contact of relay 504ᵇ, back contact of relay 511ᵇ, winding of relay 514ᵇ to battery B. The control of the release circuits by relay 514ᵇ is similar to that of the other connectors. In case the called party does not answer the release of this connector is effected by the calling subscriber as in the connectors already described.

I will now trace a call from the toll operator's position to a subscriber located in a semi-automatic exchange, using the circuits arranged as shown in Fig. 17. This figure shows the called party selected by the connector shown in Fig. 5ᵃ. However, I do not wish to limit myself to this connector. In fact, the connectors shown in the various figures may be substituted one for the other without deviating from the spirit of my invention.

Referring to Fig. 13, suppose that a toll line has operated the drop signal shown at A'. The toll operator inserts plug P into the line jack L. J. and throws her listening key L. K., thereby placing herself into telephonic connection with the calling line. She then tests for an idle trunk by touching the tip of the plug P' to the ring of the trunk jack T. J. Her busy test is accomplished over the wire 1311, back contact 1305, back contact 1301, wire 1323 to busy test relay, in a manner well known in the art. If the trunk is not busy, she inserts the plug P' into the trunk jack T. J. and thereby operates the slow relay 1411 (Fig. 14) and the relay 1301 (Fig. 13). Relay 1301 energizes relay 1302 from ground, back contact of relay 1304, 1314, front contact of relay 1301, 1315, winding of relay 1302 to battery B. The operation of relay 1301 also removes the test relay from circuit. The operation of relay 1302 places battery through the resistance coil 1322, front contact 1302, 1318, back contact of 1305, 1312, 1416, one winding of relay 1403, 1438, back contact of relay 1405, to ground causing the relay 1403 to become energized. Relay 1302 also closes a circuit from wire 1311, back contact of relay 1305, 1316, front contact of relay 1302, 1317, to portion 1290ᵃ of the switch S. S'. The operator sets up the number on the keyboard by depressing one button in each of the rows 100 M, 10 M, M, H, and T. In case the call is not for a party line, but for a private branch exchange, no button is depressed in the units and party line row. After setting up the number the start button 1219ᵃ is pressed and thereby energizes relay 1109ᵃ, and it locks to ground at the back contact of 1111ᵃ. The operation of this relay lights the lamp 1220ᵃ and connects ground through its front contact, 1295ᵃ, 1296ᵃ, back contact of relay 1266ᵃ, winding of relay 1253ᵃ to battery B. causing the shift switch S. S' to step to its second contact. This places relay 1204ᵃ in series with relay 1401, (Fig. 14) and these two control the impulses of the first digit to be sent. From this time on, the operation of the apparatus shown in Fig. 12ᵃ is similar to that described in Fig. 12. The impulses representing the first digit step the switch F' (Fig. 14) in a rotary direction in a manner identical to the stepping of the switch F in Fig. 3, and after the first secondary impulse, the switch F' steps vertically until it selects an idle inter-office trunk such as shown in Fig. 3. The impulses of the 10 M row step the switch of this trunk in a rotary direction and then it automatically selects an idle local selector such as shown in Fig. 4. The impulses representing the M row button depressed will step the local selector in a rotary direction and it will automatically select an idle "selecting connector" such as shown in Fig. 5ᵃ, (so called because it selects a non-busy trunk of a group).

We will assume for convenience that the private branch exchange, which is to be called, has three trunks extending between it and the main exchange and that the contacts of the first trunk are located at the seventh position in the row, (the contacts below this being used for trunks to some other private branch exchange.) The relay 501ᵃ, (Fig. 5ᵃ) by means of the rotary magnet 516ᵃ, causes the switch J—a to step in a rotary direction. The secondary relay 502ᵃ, when energized by the first impulse of relay 501ᵃ, holds up relay 504ᵃ just as in the preceding connectors. The first retraction of relay 502ᵃ likewise closes the circuit of relay 505ᵃ. The first impulse of the series representing the depressed button in the T row of keys again energizes relay 502ᵃ. This series of impulses by operating relay 501ᵃ causes the vertical stepping of the switch to the seventh contact in the row by means of the vertical magnet 517ª, which has been substituted for magnet 516ª through the operation of relay 505ª. After the first vertical step relay 502ª closes a circuit from ground through its front contact 532ª, springs 527ª, 551ª, winding of relay 506ª to battery B, causing the latter to pull up.

The second retraction of relay 502ª closes a circuit from ground, back contact of relay 502ª, front contact of relay 504ª, 566ª, springs 526ª, 548ª, winding of relay 508ª to battery B, causing this latter relay to become energized. Before 506ª has time to retract a test circuit is closed as follows: wiper 544ª, 573ª, front contact of relay 508ª, front contact of relay 506ª, winding of relay 509ª to ground. Should the wiper 544ª find battery on the test contact placed thereon through coil R—6 of another connector or through coil R—1 of a primary trunk, relay 509ª will become energized and be locked to ground at 573ª. Relay 509ª will keep the circuit of relay 510ª closed so that the wiper circuit will remain open. This energizing circuit for relay 510ª is from ground, back contact of relay 514ª, front contact of relay 509ª, 582ª, winding of relay 510ª to battery B.

As the called number was one of a group of trunks leading to a private branch exchange, the switch J—a has now selected the first of the group of three trunks leading thereto. Wiper 545ª' will travel over bank contacts which are connected to ground. The wiper 545ª travels over contacts connected through resistance to battery B. These contacts are shown at X, Y and Z, (Fig. 1).

The contact opposite 545ª' on the last trunk of a series leading to the same private branch, is not connected to ground, but left open. Assuming that the first trunk is busy, with relay 509ª locked, the following circuit will be closed: ground at the contact opposite 545ª', wiper 545ª', 546ª, front contact of 509ª, 547ª back contact of 506ª, 584ª back contact of 507ª, winding of 517ª to battery. The vertical magnet 517ª will become energized and step the switch J—a to the next contact. If this trunk is busy, 509ª will be held locked and a circuit from the ground opposite contact 545ª' will cause the switch to take a third step. If the third trunk is also busy relay 509ª will still remain locked. As the contact opposite 545ª has no ground connection in this case, the switch J—a will come to rest, but relay 510ª will remain energized and hold the wiper circuit open. At this time a circuit will be closed through relay 700ª, 546ª, front contact of relay 509ª 547ª, back contact of relay 506ª, 584ª, back contact of relay 507ª, winding of magnet 517ª to battery B. The relay 700ª is wound so high that the vertical magnet 517ª is not affected, but relay 516ª becomes energized. The energizing of this relay places the busy tone from 541ª back over one of the talking wires to the calling subscriber.

The calling subscriber in this case, controls the release of the connector Fig. 5ª by causing the opening of the locking winding of relay 504ª and thereby energizing the release relay 514ª. If the second trunk tested had not been busy, the locking circuit of 509ª would have been opened and in dropping back would open the stepping circuit of the vertical magnet and allow relay 510ª to become deënergized. This action closes the wiper circuit and also a circuit from battery B through the resistance coil 5 (Fig. 1) contacts Y, wiper 545ª, back contact of relay 510ª, 569ª winding of relay 512ª to ground. Relay 512ª, becoming energized closes a circuit from ground through the winding of slow relay 519ª, front contact of relay 508ª, front contact of relay 512ª, winding of relay 513ª, to battery B.

The ringing switch R. 8a. is stepped as already shown, and ringing current is placed to the called subscriber's trunk from ground through generator 529ª, cam springs 521ª 554ª, back contact of 510ª, 543ª, the line signal apparatus at the private branch exchange, back over the other side of the line, 544ª, 556ª, 596ª, cam springs 523ª, resistance to battery B. Battery, through this resistance coil holds the cut-off relay associated with the trunk wipers energized. The line discharge, following a ringing period, is effected by holding the supervisory relay 503ª shunted by ground at the springs 521ª for an instant just following the ringing period and before connecting relay 503ª to the called line. Battery for transmission is supplied through the retardation coil R—6a and ground through the relay 503ª, and the latter is energized when the private branch exchange operator answers the trunk call. This relay 503ª energizes slow relay 511ª just as in the preceding connectors, and also connects the retardation coil R—4a to one side of the talking trunk. This ground connection through R—4a operates the supervisory relay at the toll operator's position as follows: ground, winding of coil R—4a front contact of relay 503ª, 537ª wiper 433, bank contact 415, wiper 333, bank contact 315, wiper 1433 and jack spring 1,415, 1311, front contact of relay 1305, 1309, winding of relay 1303 to battery B. Relay 1305 was energized after the last set of impulses was transmitted to the selecting connector as follows: when the wiper of portion 1291ª (Fig. 12ª) reached the last contact of its bank, the circuit of relay 1111ª was closed and this closed the following circuit: ground, front contact of relay 1111ª, 1320, front contact of relay 1302, (Fig. 13) 1319, winding of relay 1305 to battery B. This relay is locked from battery B through its winding, front contact of relay 1313, front contact of relay 1304 to ground. Relay 1304 became energized as soon as relay 1305 operated and closed the wiper circuit. Battery is supplied through its winding to hold relay 1403 energized. Relay 1304 in operating opens the circuit of relay 1302, thereby cutting off the key-set shown in Fig. 12ª, rendering it available for the next connection. The supervisory lamp 1308 remains lighted until relay 1303 is energized by the answering of the called subscriber. When the called subscriber hangs up the lamp 1308 again lights and the toll operator releases the switch by removing the plug P' from the jack T. J. The removal of the plug severs the circuit of relay 1403 and releases the trunk selector shown in Fig. 14 just as the inter-office trunk, (Fig. 3) is released. From this point the release of the switches following is identical to that described in the first connection.

The private branch exchange operator controls the release of the connector just as a called subscriber releases any of the other connectors.

By modifying the circuit shown in Fig. 5ª to the extent of carrying the ground for retardation R—5a through a set of springs and back contacts on relay 514ª, the called private branch operator may control the release of the switch F' of the inter-office trunk (Fig. 3) and the local selector connected thereto. When the release relay 514ª becomes energized it opens the circuit of the relays 1403 and 303, causing the release of the associated switches in a manner identical to that described in tracing the first connection.

Having thus described my invention, what I claim and desire to secure by Letters Patent is:

1. In a telephone exchange system, the combination with automatic switching mechanism, stepping means for said automatic switching mechanism, releasing means for said automatic switching mechanism, a conductor extending to said automatic switching mechanism, means associated with said conductor for causing interruptions therein and for causing the operation of said stepping means according to the number of interruptions, a second conductor extending to said automatic switching mechanism which is normally closed during the interruptions over the first said conductor, and means controlled by interrupting the second conductor only for controlling the releasing means, substantially as set forth.

2. In a telephone exchange system, the combination with a calling and a called subscribers' lines, automatic switching mechanisms for interconnecting said lines, stepping mechanisms for said switching mechanisms, a conductor adapted to be extended to said switching mechanisms in succession, means associated with and producing interruptions in said conductor, a second conductor adapted to be extended to said switching mechanisms in succession normally closed during the interruptions in the other conductor, and means controlled over said second conductor for associating the stepping mechanisms of such switching mechanisms in operative relation with such first conductor.

3. In a telephone exchange system, the combination with a calling and a called subscriber's line, automatic switching mechanism interconnecting said lines, a conductor extending to said automatic switching mechanism, means associated with said conductor for transmitting impulses thereover for directing the action of the automatic switching mechanism so as to interconnect said lines, an additional conductor extending to said automatic switching mechanism normally closed during the transmission of impulses over the first conductor for rendering the automatic switching mechanism operable, means controlled over the second conductor independent of said first conductor for causing the release of the automatic switching mechanism, substantially as set forth.

4. In a telephone exchange system, the combination with an automatic switch, of an operator's key-board, two control conductors extending between the key-board and the automatic switch, means associated with said key-board for transmitting impulses over one of said conductors for causing the operation of the automatic switch according to the number of said impulses, additional means controlled over the other of said conductors for rendering the automatic switch operable to the impulses transmitted over the first said conductor, the second conductor being normally closed during the transmission of said impulses, means for opening the second conductor only for causing the release of the automatic switch, substantially as set forth.

5. In a telephone exchange system, the combination with an automatic switch, of an operator's key-board comprising a plurality of rows of keys, an auxiliary switch associated with and common to said rows of keys, a control conductor extending between the key-board and the automatic switch, means for causing interruptions in said control circuit whereby the selector and auxiliary switches are operated in unison, a second conductor extending between said key-board and said automatic switch normally closed during the said interruptions and for maintaining the automatic switch and key-board in association, substantially as set forth.

6. In a telephone exchange system, the combination with an automatic switch, of an operator's key-board comprising a plurality of rows of keys, an auxiliary switch associated with and common to said rows of keys, a control conductor consisting of a plurality of sections extending between the key-board and the automatic switch, means for causing the interruptions in said conductor whereby the automatic switch and the auxiliary switch step in unison, a second conductor extending between the key-board and said automatic switch normally closed during the interruptions over the first said conductor for maintaining the plurality of sections intact, substantially as set forth.

7. In a telephone exchange system, the combination with an automatic switch, stepping means for said switch comprising a stepping magnet, a relay for operating said magnet, a secondary relay for disabling said stepping means, an operator's key-board, an auxiliary switch associated with said key-board, a control conductor extending between the key-board and said automatic switch, means for causing interruptions in said control conductor whereby said automatic switch and the auxiliary switch operate in unison, means whereby the discontinuing of the interruptions in said conductor causes the secondary relay to operate and disable said stepping means, substantially as set forth.

8. In a telephone exchange system, the combination with an automatic switch, of stepping means for said switch comprising a magnet, and a relay for operating said magnet, disabling means for said automatic switch comprising a secondary relay, a control conductor extending to said automatic switch, means associated with said conductor for causing interruptions therein to actuate the stepping means of said switch, and means for discontinuing said interruptions whereby the secondary relay is rendered operable for disabling the stepping means, substantially as set forth.

9. In a telephone exchange system, the combination with an automatic switch, of stepping means for said switch comprising a magnet, and a relay for operating said magnet, disabling means for said stepping means, a conductor extending to said automatic switch, means associated with and for causing interruptions in said conductor to operate said stepping means, means for discontinuing said interruptions whereby the disabling means is rendered operable, substantially as set forth.

10. In a telephone exchange system, the combination with an automatic switch, of stepping means for said switch comprising a magnet and a relay for operating said magnet, disabling means, an operator's key-board, a control conductor extending between said key-board and said automatic switch, means associated with and for causing interruptions in said conductor for operating the stepping means, means for discontinuing the interruptions over said conductor whereby the disabling means is rendered operable for disabling said stepping means, substantially as set forth.

11. In a telephone exchange system, the combination with an automatic switch of restoring means for said switch, two trunk conductors, for said switch, a relay provided with two windings for controlling said switch, each winding being in series with one of said trunk conductors, means for energizing said relay through one winding over one of said trunk conductors, additional means provided for operating the restoring means, upon the deënergization of said relay, substantially as set forth.

12. In a telephone exchange system, the combination with an automatic switch, actuating means and restoring means for said switch, a trunk line leading to said switch comprising but two conductors over which the actuating means and restoring means are controlled, a relay for said switch provided with two windings, each winding being in series with one of said trunk conductors, means provided for energizing said relay over one of said conductors for placing the actuating means in operative condition, additional means whereby upon the deënergization of said relay, the actuating means is disabled, and the restoring means rendered operable, substantially as set forth.

13. In a telephone exchange system, the combination with a calling subscriber's line, a called subscriber's line, of automatic switching mechanism for inter-connecting said lines, including a trunk selector switch and means for selecting said switch, a trunk line comprising but two conductors arranged to connect the trunk selector to the selecting means, controlling means for said selector switch comprising a twin wound relay, each winding being in series with one of the trunk conductors, the winding of said relay being so arranged to offer no impedance to voice currents between the calling and called subscribers, substantially as set forth.

14. In a telephone exchange system, the combination with a calling subscriber's line, a called subscriber's line, of automatic switching mechanism for forming a conversational circuit between the said subscribers, a single relay intermediate of and for controlling said switching mechanism, having two windings, said windings being in series with and forming part of the conversational circuit, but arranged so as to be differential to voice currents between the calling and called subscribers, substantially as set forth.

15. In a telephone exchange system, the combination with an operator's position, of an automatic switch, a trunk line comprising but two trunk conductors for connecting said switch to the trunk jack at said operator's position, a control relay for said switch, having two windings, each winding being in series with one of said trunk conductors, means under control of the operator for energizing said relay through one winding over one trunk conductor for placing said switch in operative condition, additional means under control of the operator for restoring said switch by deënergizing said relay, substantially as set forth.

16. In a telephone exchange system, the combination with an automatic switch, said switch terminating in a trunk jack at an operator's position, a plurality of cord circuits associated with said position and adapted to be interconnected with said jack, a sending device common to said cord circuits, means whereby when a particular cord circuit is associated with said jack the sending device is also automatically associated therewith, additional means for automatically disconnecting the sending device after the final operation of said switch, substantially as set forth.

17. In a telephone exchange system, the combination with a plurality of operators' cord circuits, of an automatic switch terminating in a trunk jack, a sending device for operating said automatic switch and adapted to be associated with any one of said cord circuits, means whereby when a cord circuit is placed in association with said trunk jack the sending device is automatically associated therewith, additional means for automatically disconnecting the sending device after the final operation of the automatic switch, substantially as set forth.

18. In a telephone exchange system, the combination with an operator's position, a trunk jack at said position terminating in an automatic switch, a plurality of cord circuits at said position, a control device common to said cord circuits for controlling the operation of the automatic switch, means whereby when connection is effected between a particular cord circuit and the trunk jack the control device is automatically associated therewith, additional means whereby when the automatic switch is fully operated the control device is automatically disconnected from said cord circuit, substantially as set forth.

19. In a telephone exchange system, the combination with a series of operators' positions or key-sets, of a starting conductor for said positions, controlling means associated with said positions, whereby any of said positions can be disabled at will, and the starting conductor continued to the next position in the series, said starting conductor passing in series through the controlling means at each position, substantially as set forth.

20. In a telephone exchange system, the combination with a plurality of operators' positions or key-sets, of a starting conductor common to, and over which said positions are selected, switching means associated with each position whereby any of said positions can be rendered unselectable at will and the starting conductor continued to the next position in order, said starting conductor passing in series through the switching means at said positions, substantially as set forth.

21. In a telephone exchange system, the combination with an impulse control device, said device comprising a plurality of rows of buttons, means for holding said buttons in a depressed position, means comprising release magnets for restoring said holding means after the complete operation of said control device, contacts associated with said magnets, said contacts serving to control the connections from said keys, substantially as set forth.

22. In a telephone exchange system, the combination with a plurality of operators' positions, of a plurality of control circuits for said positions, switching means for said control circuits whereby any one of said control circuits can at will be placed in operative condition for regulating the operation of said operators' positions said control circuit being in series with said switching means, substantially as set forth.

23. In a telephone exchange system, the combination with automatic switching mechanism, of an operator's position, three conductors extending from the switching mechanism to said operator's position, means exercised over one of said conductors for controlling the actuation of the automatic switching mechanism, means exercised over the second trunk conductor for placing the actuating means in operative condition, additional means exercised over the third conductor for controlling the release of said switching mechanism, substantially as set forth.

24. In a telephone exchange system, the combination with automatic switching mechanism, of an operator's position, a conductor extending between said switching mechanism and said operator's position, means controlled over said conductor for signaling said position, additional means controlled over said trunk conductor whereby the signaling means is disabled, substantially as set forth.

25. In a telephone exchange system, the combination with automatic switching mechanism, of a trunk line, a set of selective relays for interconnecting said trunk line and said automatic switching mechanism, a starting conductor for said trunk line, a secondary relay associated with said trunk line, said relay becoming energized when said selective relays are operated, the energizing of said secondary relay serving to hold the selective relays operative and to transfer the starting conductor to another trunk line, substantially as set forth.

26. In a telephone exchange system, the combination with a calling and a called subscriber's line, automatic switching mechanism for interconnecting said lines, two conductors for said automatic switching mechanism over which said subscribers converse, releasing means for said automatic switching mechanism, said releasing means being controlled by severing only one of said conductors at the termination of the conversation between the calling and called subscribers, substantially as set forth.

27. In a telephone exchange system, the combination with a calling and a called subscriber's line, automatic switching mechanism for interconnecting said lines, two conductors for said automatic switching mechanism over which said subscribers are supplied with battery for conversational purposes, releasing means for said automatic switching mechanism, means under control of said subscribers for connecting battery to said trunk conductors during conversation, said battery connection being independent of the battery supply for conversational purpose, and means under control of the subscribers for removing battery from said conductors at the termination of a conversation for affecting the releasing means, substantially as set forth.

28. In a telephone exchange system, the combination with a called subscriber's station, said station being equipped with local batteries for speech transmission, a connector switch for effecting connection with said station, a relay associated with said connector switch, said relay energized when connection is effected with said station and deenergized when the called subscriber removes his receiver, releasing means for said connector circuit, said releasing means becoming effective when the called subscriber replaces his receiver and causes the energization of said relay, substantially as set forth.

29. In a telephone exchange system, the combination with a station having a normally closed circuit, of a connector switch, releasing means for said switch, a relay associated with said switch and energized when connection is effected with said station, means at said station for opening said circuit and causing the deënergization of said relay, additional means whereby when the circuit is subsequently closed the releasing means for said automatic switch is rendered active, substantially as set forth.

30. In a telephone exchange system, the combination with a calling subscriber's line and a group of called lines or trunks, a connector switch for automatically selecting an idle one of said lines or trunks, means whereby in case all the lines are busy the connector switch will select the last one of the group, an electroresponsive device responsive to an electrical condition on the contacts individual to such last line of the group to connect a busy signal to the calling subscriber's line, such device being disabled by the electrical condition on the contacts of the other lines.

31. In a telephone exchange system, the combination with a calling subscriber's line and a group of called trunks or lines, an automatic switch for automatically selecting an idle one of said lines, means whereby in case all of said lines are busy the automatic switch is stepped in engagement with the last line, a relay associated with such switch which when operated controls the connection of a busy signal to the calling lines, and a shunt circuit for preventing the operation of such relay maintained through the contacts of all of the lines of said group except the last line.

32. In a telephone exchange system, the combination with a calling subscriber's line, of an operator's position or key-set, means for connecting said line with said position, said connecting means comprising primary, secondary and tertiary apparatus, releasing means for said apparatus, the release of the tertiary apparatus being initiated at the secondary apparatus and the release of the secondary apparatus being initiated at the primary apparatus, substantially as set forth.

33. In a telephone exchange system, the combination with a calling subscriber's line, of an operator's position or key-set, means for connecting said line with said position, said connecting means comprising primary, secondary and tertiary apparatus, releasing means for said apparatus, the release of the tertiary apparatus being initiated at the secondary apparatus, and the release of the secondary apparatus being initiated at the primary apparatus, said releasing means being under control of either the calling subscriber or at said operator's position, substantially as set forth.

34. In a telephone exchange system, the combination with a two-wire trunk selector, test contacts for said trunk selector, means for selecting said trunk at said contacts, a relay associated with said trunk selector, said relay being controlled over one of said two wires, restoring means for said selecting means, restoring means for said trunk selector, means whereby said relay is operated after the operation of restoring means for the selecting means, the operation of said relay rendering the test contacts busy until the restoration of the trunk selector, substantially as set forth.

35. In a telephone exchange system, the combination with a selector switch, of two trunk conductors extending to and over which said switch is controlled, restoring means for said switch, a relay associated with said switch and controlled over one of said trunk conductors to render said switch unselectable until its complete restoration, substantially as set forth.

36. In a telephone exchange system, the combination with a selector switch having associated test contacts, two trunk conductors extending to and over which said switch is controlled, a relay associated with one of said trunk conductors, said relay rendered operable during the restoration of said switch to render said test contacts busy, substantially as set forth.

37. In a telephone exchange system, the combination with a selector switch, two trunk conductors extending to and over which said switch is controlled, contacts for said switch, and means for selecting said contacts, a relay associated with said contacts and energized when selection is made therewith, restoring means for the selecting means, restoring means for the selector switch, a second relay associated with said contacts and energized upon the restoration of the selecting means and deënergization of the first said relay, the energization of the second relay continuing and rendering the contacts unselectable until the restoration of said selector switch, substantially as set forth.

38. In a telephone exchange system, the combination with a plurality of telephone lines divided into groups, of a relay for each group of said lines, apparatus for selecting said lines, controlling means for determining the order in which said apparatus is placed in service, additional means whereby in case of a delay in the operation of said relay the controlling means is rendered operable to change the order of the selecting apparatus, substantially as set forth.

39. In a telephone exchange system, the combination with a plurality of telephone lines divided into groups, of a relay for each group of said lines, apparatus for selecting said lines, controlling means for determining the order in which said apparatus is placed in service, additional means whereby in case said relay remains operated for an abnormal period the controlling means is rendered operable to change the order of the selecting apparatus, substantially as set forth.

40. In a telephone exchange system, the combination with a calling subscriber's line, of a called subscriber's line, automatic switching mechanism for interconnecting said lines, an operator's position and means associated therewith for controlling said automatic switching mechanism, two conductors extending from the automatic switching mechanism to said position, means exercised over one of said conductors for maintaining the automatic switching mechanism in association with said position, additional means exercised over the other one of said conductors for causing the operation of said automatic switching mechanism to interconnect said lines, substantially as set forth.

41. In a telephone exchange system, the combination with automatic switching mechanism, of an operator's position having means for controlling the operation of the automatic switching mechanism, two trunk conductors for associating the operator's position with said automatic switching mechanism and over which the latter is controlled, means exercised over one of said conductors for maintaining the operator's position and automatic switching mechanism in association, additional means exercised over the other one of said conductors for causing the operation of the automatic switching mechanism, substantially as set forth.

42. In a telephone exchange system, the combination with a selector switch, of a control relay associated with said switch, a cut-off relay associated with said switch, means associated with said switch for maintaining the circuit of the cut-off relay before the operation of said switch, additional means whereby the circuit of said cut-off relay is maintained by the operation of the control relay after the operation of said switch, substantially as set forth.

43. In a telephone exchange system, the combination of automatic switching mechanism, of a trunk line, a set of selective relays for interconnecting said trunk line and said automatic switching mechanism, a starting conductor for said trunk line, a signal conductor controlled by said trunk line, a secondary relay associated with said trunk line, said relay becoming energized when the selective relays are operated, the energizing of said relay serving to hold the selective relays operative, to transfer the starting conductor and to close said signal conductor, substantially as set forth.

44. In a telephone exchange system, the combination with a calling subscriber's line, of an operator's position, connecting means for said line and said position, a signal relay associated with said position, a starting conductor for said position, means whereby when said position and said line are connected the said relay is operated to shift said starting conductor, substantially as set forth.

45. In a telephone exchange system, the combination with a calling and a called subscriber's line, of automatic switching mechanism for interconnecting said lines, an operator's position and controlling device associated therewith for operating said automatic switching mechanism, connecting means for said line and said position, a signal and relay at said position, a starting conductor for said position, means provided for operating said relay when a calling line is connected with said position, the operation of said relay causing the display of the signal and transfer of the starting conductor, additional means provided for maintaining said relay operated during the operation of the automatic switching mechanism, substantially as set forth.

46. In a telephone exchange system, the combination with automatic switching mechanism, of an operator's position and associated means for controlling said switching mechanism, two conductors interconnecting said position and switching mechanism, a controlling relay associated with said switching mechanism, a starting relay associated with said operator's position, means whereby said relays are placed in series over one of said conductors to allow the operation of the automatic switching mechanism by the controlling means over the other one of said conductors, substantially as set forth.

47. In a telephone exchange system, the combination with an automatic switch, of stepping means for said switch comprising a magnet, a primary relay for operating said magnet, shifting means for said switch, a slow acting secondary relay for controlling said shifting means, said secondary relay rendered operable by the initial operation of the primary relay over a circuit independent of said magnet, substantially as set forth.

48. In a telephone exchange system, the combination with an automatic switch, of stepping means for said switch including a magnet, shifting means for said switch comprising a slow acting relay controlled independently of said magnet, additional means whereby the initial operation of the stepping means renders the slow acting relay operable for actuating said shifting means, substantially as set forth.

49. In a telephone exchange system, the combination with an automatic switch having associated cam springs which are operated by the initial movement of the switch, of primary stepping means for said switch, secondary stepping means for said switch, means comprising a slow acting relay whereby after the operation of the primary stepping means the said secondary stepping means is rendered operable through said cam springs, substantially as set forth.

50. In a telephone exchange system, the combination with a calling and called subscriber's line, a series of automatic switches for inter-connecting said lines, two conductors for said automatic switches over which said subscribers converse, releasing means for said automatic switches, means for connecting battery to one of said conductors after the final operation of the first switch of the series for placing the releasing means in operable condition, means whereby when the first switch of the series is released battery will be removed from said conductor and cause the release of the other switches in said series, substantially as set forth.

51. In a telephone exchange system, the combination with a calling and a called subscriber's line, a series of automatic switches for inter-connecting said lines, two conductors for said automatic switches over which said subscribers converse, means whereby after the final operation of the first switch of the series battery is connected to one of said conductors and maintained thereon during conversation for controlling the release of the various switches, means whereby after the release of the first switch of the series said battery is removed from the conductor, substantially as set forth.

52. In a telephone exchange system, the combination with an automatic switch, of restoring means for said switch, two trunk conductors for said switch, a slow relay provided with two windings for controlling said restoring means, each winding being in series with one of said trunk conductors, means for energizing said relay through one winding over one of said trunk conductors, additional means operated upon the removal of the energizing means for causing a delayed action of the restoring means, substantially as set forth.

53. In a telephone exchange system, the combination with a calling subscriber's line, of a called subscriber's line, of automatic switching mechanism for forming a conversational circuit between the said subscribers, restoring means for said switching mechanism, a relay having two windings, said windings being in series with and forming part of the conversational circuit intermediate of said switching mechanism, means for energizing said relay, additional means under control of the called subscriber for causing the deënergization of said relay and operation of said restoring means substantially as set forth.

54. In a telephone exchange system, the combination with a calling subscriber's line, of a called subscriber's line, of automatic switching mechanism for forming a conversational circuit between the said subscribers, restoring means for said switching mechanism, a relay having two windings, said windings being in series with and forming part of the conversational circuit intermediate of said switching mechanism, means for energizing said relay, additional means under control of the calling subscriber for causing the deënergization of said relay and operation of said restoring means, substantially as set forth.

55. In a telephone exchange system, the combination with calling subscriber's line, of a called subscriber's line, automatic switching mechanism for forming a conversational circuit between said subscribers, said circuit comprising two conductors only, a relay intermediate of and for controlling said switching mechanism, said relay having two windings, said windings being in series with and forming part of the conversational circuit, means for energizing said relay, means under control of the called subscriber's line for causing the deënergization of said relay, substantially as set forth.

56. In a telephone exchange system, the combination with automatic switching mechanism, stepping means and supervisory means for said automatic switching mechanism, means rendered operable by said supervisory means for causing the display of a signal, releasing means for said automatic switching mechanism, a conductor extending to said switching mechanism over which the stepping and supervisory means are wholly controlled, a second conductor extending to said switching mechanism over which the releasing means is wholly controlled, substantially as set forth.

57. In a telephone exchange system, the combination with a calling and a called subscriber's line, a link circuit for inter-connecting said lines, said link circuit comprising a first selector switch, a connector switch and an intermediate switch, two conductors only extending from said first selector switch to said intermediate switch, means exercised over one of said conductors for supervising and actuating said connector and intermediate switches, means exercised over the other conductor for controlling the release of said switches, substantially as set forth.

58. In a telephone exchange system, the combination with a calling and a called subscriber's line, of a selector switch, of a connector switch, an intermediate switch for extending the connection from the selector switch to the connector switch, two conductors only for extending said connection, means exercised over one of said conductors for causing the actuation of said connector and intermediate switches, means exercised over the other conductor for causing the release of said switches, substantially as set forth.

59. In a telephone exchange system, the combination with a calling and a called subscriber's line, of a link circuit for inter-connecting said lines, said link circuit comprising a first selector switch, a connector switch and an intermediate switch, stepping means and restoring means for said connector and intermediate switches controlled over two conductors only, said stepping means being controlled over one of said conductors, while the restoring means is controlled over the other of said conductors, substantially as set forth.

60. In a telephone exchange system, the combination with a calling and a called subscriber's line, of automatic switching mechanism for inter-connecting said lines, two conductors interconnecting said automatic switching mechanism over which said subscribers converse, releasing means for said automatic switching mechanism, means under control of said subscribers for opening one of said conductors intermediate of said switching mechanism to operate said releasing means, substantially as set forth.

61. In a telephone exchange system, the combination with a calling and a called subscriber's line, of automatic switching mechanism for inter-connecting said lines, two conductors interconnecting said automatic switching mechanism over which said subscribers converse, releasing means for said automatic switching mechanism, means under control of said calling subscriber for opening one of said conductors intermediate of said switching mechanism to operate said releasing means, substantially as set forth.

62. In a telephone exchange system, the combination with a calling and a called subscriber's line, of automatic switching mechanism for inter-connecting said lines, two conductors interconnecting said automatic switching mechanism over which said subscribers converse, releasing means for said automatic switching mechanism, means under control of said called subscriber for opening one of said conductors intermediate of said switching mechanism to operate said releasing means, substantially as set forth.

63. In a telephone exchange system, the combination with a calling subscriber's line, of an operator's position, means for connecting said line with said position, said connecting means comprising a primary selection, a secondary or intermediate selection and a tertiary selection, two talking conductors for controlling the connecting means, said conductors passing through the secondary or intermediate selecting means and being free from all local connections at such point, substantially as set forth.

64. In a telephone exchange system, the combination with a calling subscriber's line, of a primary trunk for effecting connection with said line, an operator's position, selecting means for said position, intermediate selecting means interposed between the selecting means of the operator's position and said primary trunk for effecting connection therewith, two control conductors over which the calling subscriber converses with said operator's position, said conductors being free from all controlling means excepting at the primary trunk and operator's position, substantially as set forth.

65. In a telephone exchange system, the combination with a calling subscriber's line, of a called subscriber's line, automatic switching mechanism for forming a conversational circuit between said subscribers, said circuit comprising two conductors only, a relay having two windings, said windings being in series with and through which the conversational circuit is entirely carried, means for initially energizing said relay, additional means whereby said relay is held energized until the restoration of said switching mechanism, substantially as set forth.

66. In a telephone system, the combination with an automatic switch provided with a set of cam springs, of a testing relay for said switch which is energized during the selection of an idle contact in said switch, a second relay associated with said switch, means for energizing the second relay including a contact on said test relay operated when an idle contact is selected and after the operation of the cam springs associated with said switch, substantially as set forth.

67. In a telephone exchange system, the combination with an automatic switch provided with a set of cam springs, trunk conductors for said switch, a test relay for said switch being held in an energized position during the selection of an idle contact in said switch, a second relay for said switch, means for energizing the second relay after the deënergization of the test relay and after the operation of said cam springs, the operation of the second relay serving to close said trunk conductors, substantially as set forth.

68. In a telephone exchange system, the combination with a trunk jack, said trunk jack terminating in an automatic switch, restoring means for said switch, additional means provided for rendering said trunk jack busy until the restoration of said switch, substantially as set forth.

69. In a telephone exchange system, the combination with a two-wire trunk selector, trunk jacks for said trunk selector, means for selecting said trunk jacks, a relay associated with said trunk jacks, said relay being controlled over one of said two wires, restoring means for said trunk selector, means whereby said relay is operated during the restoration of the trunk selector, the operation of said relay rendering said trunk jacks busy, substantially as set forth.

70. In a telephone exchange system, the combination with a selector switch having associated trunk jacks, two trunk conductors extending to and over which said switch is controlled, a relay associated with one of said trunk conductors, said relay rendered operable during the restoration of said switch to render said trunk jacks busy, substantially as set forth.

71. In a telephone exchange system, the combination with an automatic switch, a test relay for said switch, a controlling relay for said switch, a slow acting relay operated upon the energization of said control relay, a second relay operated upon the deënergization of said control relay, means whereby the test relay is rendered operable during the energization of the slow relay and the second said relay, substantially as set forth.

72. In a telephone exchange system, the combination with an automatic switch, a test relay for said switch, a controlling relay associated with said switch, two additional relays associated with said switch, one of said relays operated upon the energization of said control relay and the other upon the deënergization of said control relay, the energization of the two additional relays serving to render the test relay directly operable, substantially as set forth.

73. In a telephone exchange system, the combination with a connector and a selector switch, of a repeating relay for said connector switch, disabling means for said relay, means whereby said disabling means is rendered effective while said selector and connector switches are in association, substantially as set forth.

74. In a telephone exchange system, the combination with an automatic switch provided with a set of cam springs, a plurality of impulse circuits for said switch, means controlling said circuits comprising a primary relay and secondary relay, contacts associated with said primary relay for operating said secondary relay in conjunction with said cam springs, an additional contact on said primary relay for controlling the impulse circuits for said switch, said circuits being controlled upon the energization of the primary relay and the deënergization of the secondary relay, substantially as set forth.

75. In a telephone exchange system, the combination with a connector switch, of a release relay associated with said switch, a selector switch for association with said connector switch, restoring means for said switches, means for energizing said relay, additional means for maintaining said relay energized until the restoration of the selector and connector switches, substantially as set forth.

76. In a telephone exchange system, the combination with a connector switch having associated contacts, of a release relay for said switch, a selector switch, means for associating said selector switch with said connector switch over said contacts, restoring means for said switches, means for energizing said relay, additional means for maintaining said relay energized until the disassociation of said selector and connector switches and the restoration of the latter, substantially as set forth.

77. In a telephone exchange system, the combination with a calling and a called subscriber's line, of automatic switching mechanism for forming a conversational circuit between said subscribers, means under control of the called subscriber for completing a battery bridge to said conversational circuit independent of the battery supply for conversational purposes, substantially as set forth.

78. In a telephone exchange system, the combination with a calling and a called subscriber's line, of automatic switching mechanism for forming a conversational circuit between said subscribers, means under control of the called subscriber for completing a battery bridge to said conversational circuit, said battery bridge independent of the battery supply for either the calling or called subscriber, substantially as set forth.

79. In a telephone exchange system, the combination with an automatic switch, of a primary relay responsive to current impulses for operating said switch, a secondary relay responsive to said primary relay over a circuit independent of that for operating said switch, a plurality of control relays, means under control of the secondary relay for operating said control relays in a predetermined order, substantially as set forth.

80. In a telephone exchange system, the combination with an automatic switch, of current impulses for operating said switch, a primary relay associated with said switch and responsive to all of said impulses, a secondary relay controlled by a contact in said primary relay, a plurality of control relays associated with said switch, said control relays being operated in a certain order by the coöperation of the primary and secondary relays, the operation of said controlling relays serving to change the operating conditions of said switch, substantially as set forth.

81. In a telephone exchange system, the combination with a calling subscriber's line, of a called subscriber's line, automatic switching mechanism for forming a conversational circuit between said subscribers, said automatic switching mechanism comprising a series of selector switches and a connector switch, a relay associated with each of said selector switches, each of said relays being provided with two windings, said windings being in series with and forming part of the conversational circuit, means for energizing said relays, additional means associated with said selector switches for maintaining said relays energized until the selection of a connector switch, means associated with the connector switch for maintaining said relays energized after the operation of the selector switches, substantially as set forth.

82. In a telephone exchange system, the combination with a calling and called subscriber's line, of a series of selector switches and a connector switch for forming a conversational circuit between said subscribers, operating and selecting means for said switches, a relay provided with two windings associated with each of said selector switches, said windings being in series with and forming part of the conversational circuit, means for energizing said relays, additional means associated with the last selector switch of the series for maintaining the relays of the preceding selectors energized, additional means associated with the connector switch for maintaining said relays energized after the operation of the last selector switch of the series, substantially as set forth.

In testimony whereof I affix my signature in presence of two witnesses.

HARRY G. WEBSTER.

Witnesses:
A. C. STUART,
W. N. TUNE.